(12) United States Patent
Venugopal et al.

(10) Patent No.: US 12,490,130 B2
(45) Date of Patent: Dec. 2, 2025

(54) CHANNEL STATE INFORMATION (CSI) SIGNALING FOR MULTIPLE REPORT METRICS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/361,201

(22) Filed: Jun. 28, 2021

(65) Prior Publication Data

US 2022/0007224 A1 Jan. 6, 2022

Related U.S. Application Data

(60) Provisional application No. 63/047,862, filed on Jul. 2, 2020.

(51) Int. Cl.
*H04W 24/10* (2009.01)
*H04B 7/06* (2006.01)

(52) U.S. Cl.
CPC ......... *H04W 24/10* (2013.01); *H04B 7/0626* (2013.01)

(58) Field of Classification Search
CPC .. H04B 7/0621; H04B 7/0623; H04B 7/0626; H04B 7/0628; H04B 7/0632; H04B 7/0634; H04B 7/0695; H04B 7/088; H04L 5/0048; H04L 5/0051; H04L 5/0053; H04L 5/0057; H04Q 2209/25; H04W 16/28; H04W 24/10; H04W 72/0446; H04W 72/21; H04W 72/23
See application file for complete search history.

(56) References Cited

U.S. PATENT DOCUMENTS

| | | | |
|---|---|---|---|
| 2012/0115541 A1* | 5/2012 | Suga .................... | H04W 36/22 455/525 |
| 2018/0062724 A1* | 3/2018 | Onggosanusi ....... | H04B 7/0421 |
| 2018/0198511 A1* | 7/2018 | Maamari ............. | H04B 7/0626 |
| 2018/0219664 A1* | 8/2018 | Guo ..................... | H04L 5/0053 |
| 2019/0306915 A1* | 10/2019 | Jin ....................... | H04W 76/28 |
| 2020/0029274 A1* | 1/2020 | Cheng ................. | H04W 76/28 |
| 2020/0127724 A1* | 4/2020 | Kang ................... | H04W 76/27 |
| 2020/0296630 A1* | 9/2020 | Thaliath .............. | H04W 28/16 |

(Continued)

*Primary Examiner* — Mohammad S Adhami

(74) *Attorney, Agent, or Firm* — Loza & Loza, LLP

(57) ABSTRACT

Aspects relate to configuration for channel state information (CSI) signaling. For example, a base station may transmit, to a user equipment (UE), a configuration message indicating report metrics, where each of the report metrics is associated with at least one corresponding CSI resource set of CSI resource sets associated with antenna panels configured for communication with the UE. The base station may further transmit at least one reference signal via at least one of the antenna panels to the UE in accordance with the configuration message. The base station may further receive, from the UE, a CSI report that includes report quantity values respectively associated with the report metrics, where the report quantity values are based on measurement of the at least one reference signal according to the configuration message.

27 Claims, 17 Drawing Sheets

(56) References Cited

U.S. PATENT DOCUMENTS

| | | | |
|---|---|---|---|
| 2021/0022130 A1* | 1/2021 | Gao | H04B 7/063 |
| 2021/0028843 A1* | 1/2021 | Zhou | H04L 5/0053 |
| 2021/0288707 A1* | 9/2021 | Hang | H04B 7/0626 |
| 2022/0006496 A1* | 1/2022 | Park | H04W 72/23 |
| 2023/0042336 A1* | 2/2023 | Matsumura | H04B 7/0404 |
| 2023/0075610 A1* | 3/2023 | Matsumura | H04B 7/0691 |
| 2023/0112922 A1* | 4/2023 | Zhu | H04W 24/10 370/329 |
| 2023/0189270 A1* | 6/2023 | Matsumura | H04B 7/06952 370/329 |
| 2023/0208490 A1* | 6/2023 | Kim | H04L 5/0051 370/329 |

\* cited by examiner

CHANNEL STATE INFORMATION (CSI) SIGNALING FOR MULTIPLE REPORT METRICS

PRIORITY CLAIM

This application claims priority to and the benefit of provisional patent application No. 63/047,862 filed in the United States Patent & Trademark Office on Jul. 2, 2020, the entire content of which is incorporated herein by reference as if fully set forth below in its entirety and for all applicable purposes.

TECHNICAL FIELD

The technology discussed below relates generally to wireless communication networks, and more particularly, to optimization of channel state information (CSI) reporting. Some embodiments and techniques enable and provide communication devices, methods, and systems for a user equipment (UE) to improve CSI reporting.

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information—reference signals (CSI-RS) or synchronization signal blocks (SSBs), to the UE.

After channel estimation, the UE may return a channel state information (CSI) report indicating the quality of the channel to the base station. The CSI may include, for example, a channel quality indicator (CQI) that indicates to the base station an MCS to use for transmissions to the UE, a rank indicator (RI) that indicates to the base station the number of layers to use for transmissions to the UE, a precoding matrix indicator (PMI) that indicates to the base station the precoding matrix to use for transmissions to the UE, and other suitable parameters.

The base station (e.g., gNodeB (gNB)) can configure the UE with one or more CSI report settings. Each CSI report setting may indicate, for example, the CSI related parameters to be reported (e.g., one or more of the CQI, PMI, RI, etc.), the time-domain behavior of CSI reports (e.g., periodic, semi-persistent, or aperiodic), the frequency granularity for reporting the CQI and PMI (e.g., wideband or sub-band), codebook configuration, and other suitable parameters. Each CSI report setting may further be associated with a respective CSI resource setting that specifies the resource elements (REs) on which CSI-RSs may be transmitted, along with a set of ports at the gNB from which the CSI-RSs may be transmitted.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to providing multiple report metrics for report quantities associated with multiple resource sets in a configuration message to a user equipment for CSI reporting. Because multiple configuration messages are not transmitted to convey multiple report metrics, a process to configure the UE for CSI reporting is simplified and the resources are utilized efficiently.

In one example, a method of wireless communication by a base station is disclosed. The method includes transmitting, to a UE, a configuration message indicating a plurality of report metrics, wherein each of the plurality of report metrics is associated with at least one corresponding channel state information (CSI) resource set of a plurality of CSI resource sets associated with a plurality of antenna panels configured for communication with the UE, transmitting at least one reference signal via at least one of the plurality of antenna panels to the UE in accordance with the configuration message, and receiving, from the UE, a CSI report that includes report quantity values respectively associated with the plurality of report metrics, wherein the report quantity values are based on measurement of the at least one reference signal according to the configuration message. In an aspect, each of the plurality of report metrics may be associated with a respective one of the plurality of antenna panels.

In another example, a base station for wireless communication is disclosed. The base station includes at least one processor, a transceiver communicatively coupled to the at least one processor, and a memory communicatively coupled to the at least one processor. The at least one processor is configured to transmit, to a UE, a configuration message indicating a plurality of report metrics, wherein each of the plurality of report metrics is associated with at least one corresponding CSI resource set of a plurality of CSI resource sets associated with a plurality of antenna panels configured for communication with the UE, transmit at least one reference signal via at least one of the plurality of antenna panels to the UE in accordance with the configuration message, and receive, from the UE, a CSI report that includes report quantity values respectively associated with the plurality of report metrics, wherein the report quantity values are based on measurement of the at least one reference signal according to the configuration message.

In another example, a non-transitory computer-readable storage medium having instructions thereon for a base station is disclosed. The instructions, when executed by a processing circuit, cause the processing circuit to transmit, to a UE, a configuration message indicating a plurality of report metrics, wherein each of the plurality of report metrics is associated with at least one corresponding CSI resource set of a plurality of CSI resource sets associated with a plurality of antenna panels configured for communication with the UE, transmit at least one reference signal via at least one of the plurality of antenna panels to the UE in accordance with the configuration message, and receive, from the UE, a CSI report that includes report quantity values respectively associated with the plurality of report metrics, wherein the report quantity values are based on measurement of the at least one reference signal according to the configuration message.

In a further example, a base station for wireless communication is disclosed. The base station includes means for transmitting, to a UE, a configuration message indicating a plurality of report metrics, wherein each of the plurality of report metrics is associated with at least one corresponding CSI resource set of a plurality of CSI resource sets associated with a plurality of antenna panels configured for communication with the UE, means for transmitting at least one reference signal via at least one of the plurality of antenna panels to the UE in accordance with the configuration message, and means for receiving, from the UE, a CSI report that includes report quantity values respectively associated with the plurality of report metrics, wherein the report quantity values are based on measurement of the at least one reference signal according to the configuration message.

In one example, a method of wireless communication by a UE is disclosed. The method includes receiving, from a base station, a configuration message indicating a plurality of report metrics, wherein each of the plurality of report metrics is associated with at least one corresponding CSI resource set of a plurality of CSI resource sets associated with a plurality of antenna panels configured for communication with the UE, receiving a plurality of reference signals from the plurality of antenna panels, respectively, performing measurements of the plurality of reference signals according to the plurality of report metrics, respectively, generating report quantity values respectively associated with the plurality of report metrics based on the measurements of the plurality of reference signals respectively, and transmitting, to the base station, a CSI report that includes the report quantity values. In an aspect, each of the plurality of report metrics may be associated with a respective one of the plurality of antenna panels.

In another example, a UE for wireless communication is disclosed. The UE includes at least one processor, a transceiver communicatively coupled to the at least one processor, and a memory communicatively coupled to the at least one processor. The at least one processor is configured to receive, from a base station, a configuration message indicating a plurality of report metrics, wherein each of the plurality of report metrics is associated with at least one corresponding CSI resource set of a plurality of CSI resource sets associated with a plurality of antenna panels configured for communication with the UE, receive a plurality of reference signals from the plurality of antenna panels, respectively, perform measurements of the plurality of reference signals according to the plurality of report metrics, respectively, generate report quantity values respectively associated with the plurality of report metrics based on the measurements of the plurality of reference signals respectively, and transmit, to the base station, a CSI report that includes the report quantity values.

In another example, a non-transitory computer-readable storage medium having instructions thereon for a UE is disclosed. The instructions, when executed by a processing circuit, cause the processing circuit to receive, from a base station, a configuration message indicating a plurality of report metrics, wherein each of the plurality of report metrics is associated with at least one corresponding CSI resource set of a plurality of CSI resource sets associated with a plurality of antenna panels configured for communication with the UE, receive a plurality of reference signals from the plurality of antenna panels, respectively, perform measurements of the plurality of reference signals according to the plurality of report metrics, respectively, generate report quantity values respectively associated with the plurality of report metrics based on the measurements of the plurality of reference signals respectively, and transmit, to the base station, a CSI report that includes the report quantity values.

In a further example, a UE for wireless communication is disclosed. The UE includes means for receiving, from a base station, a configuration message indicating a plurality of report metrics, wherein each of the plurality of report metrics is associated with at least one corresponding CSI resource set of a plurality of CSI resource sets associated with a plurality of antenna panels configured for communication with the UE, means for receiving a plurality of reference signals from the plurality of antenna panels, respectively, means for performing measurements of the plurality of reference signals according to the plurality of report metrics, respectively, means for generating report quantity values respectively associated with the plurality of report metrics based on the measurements of the plurality of reference signals respectively, and means for transmitting, to the base station, a CSI report that includes the report quantity values.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
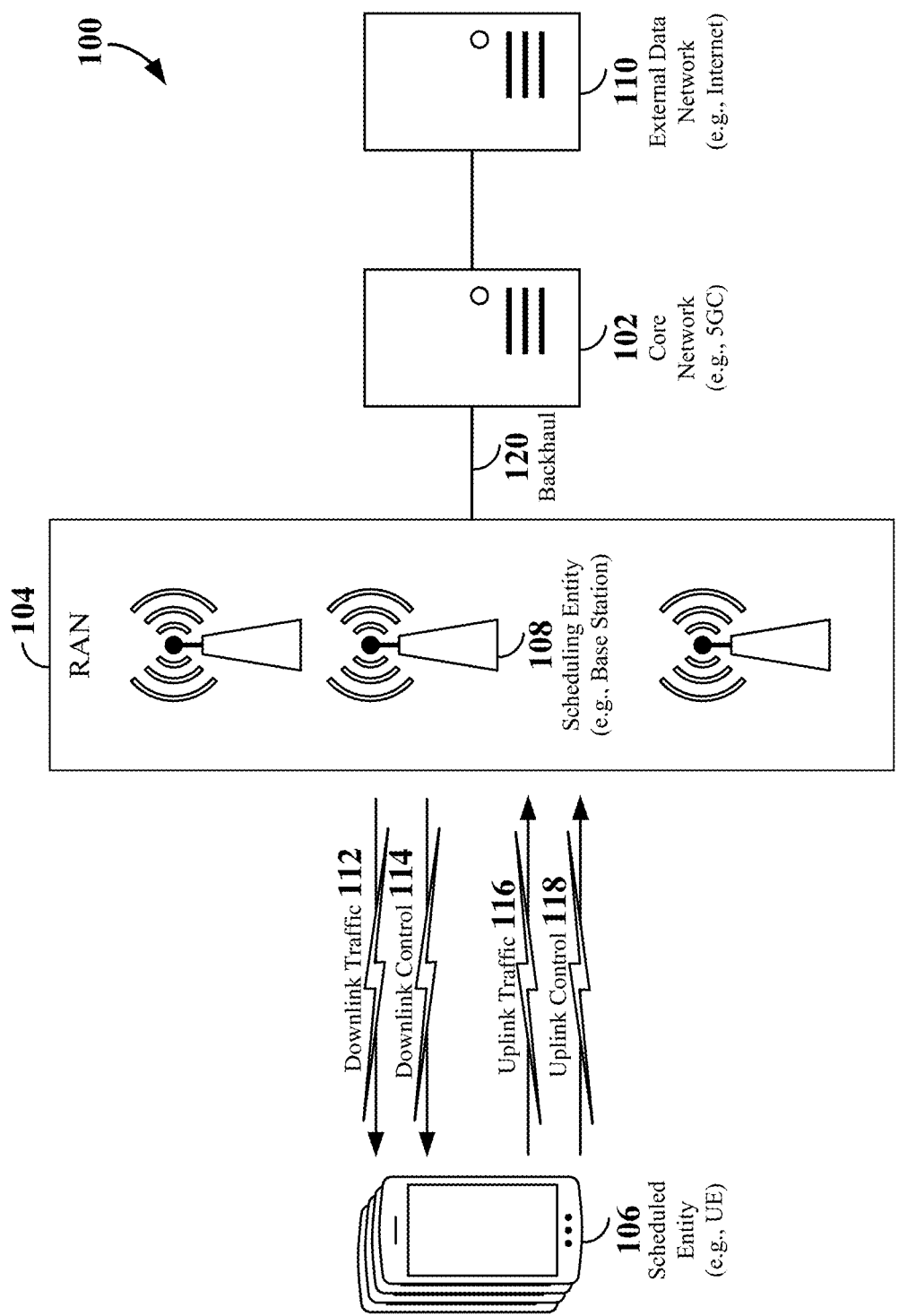
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication;

such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118 to the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
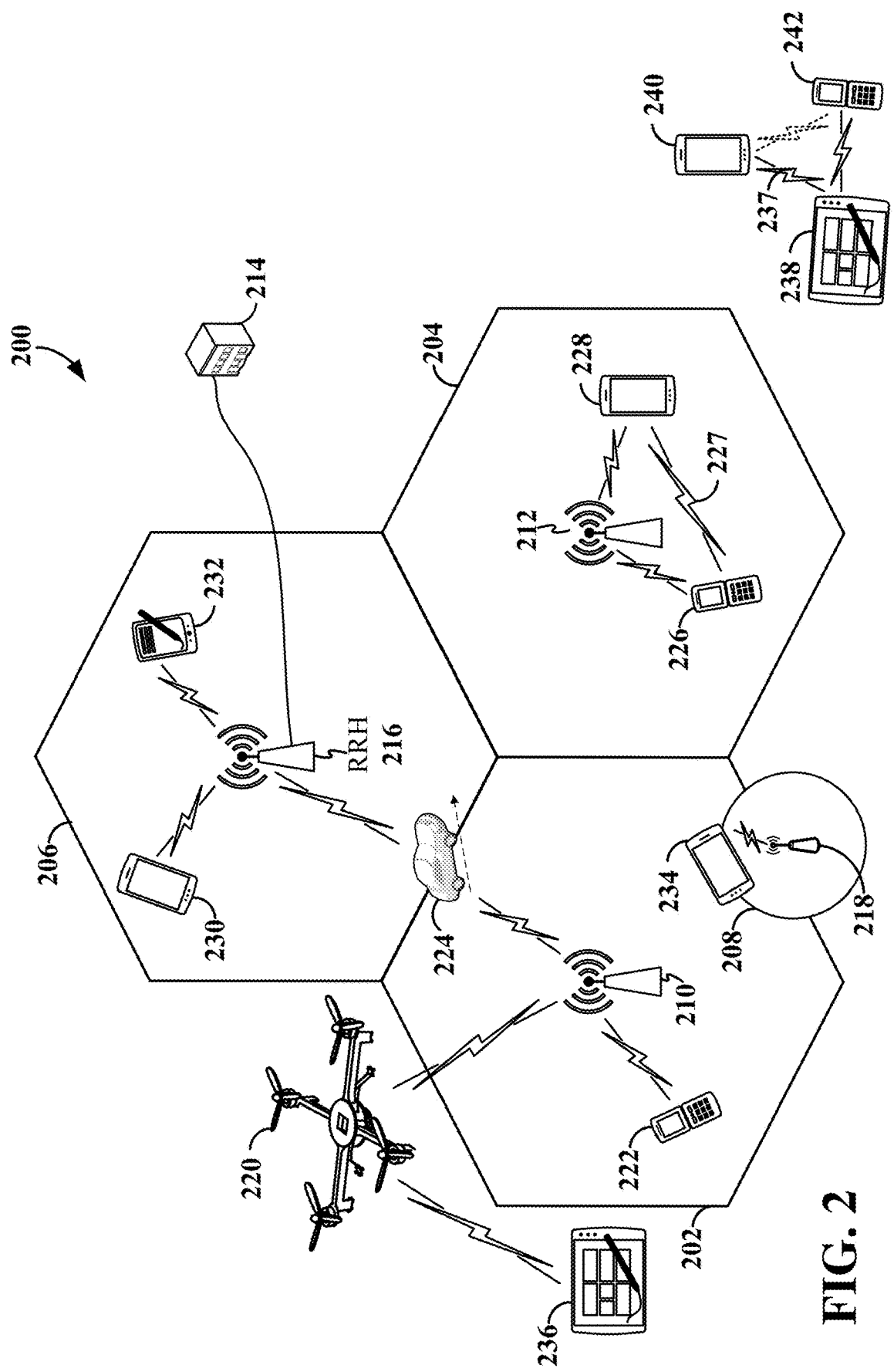
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
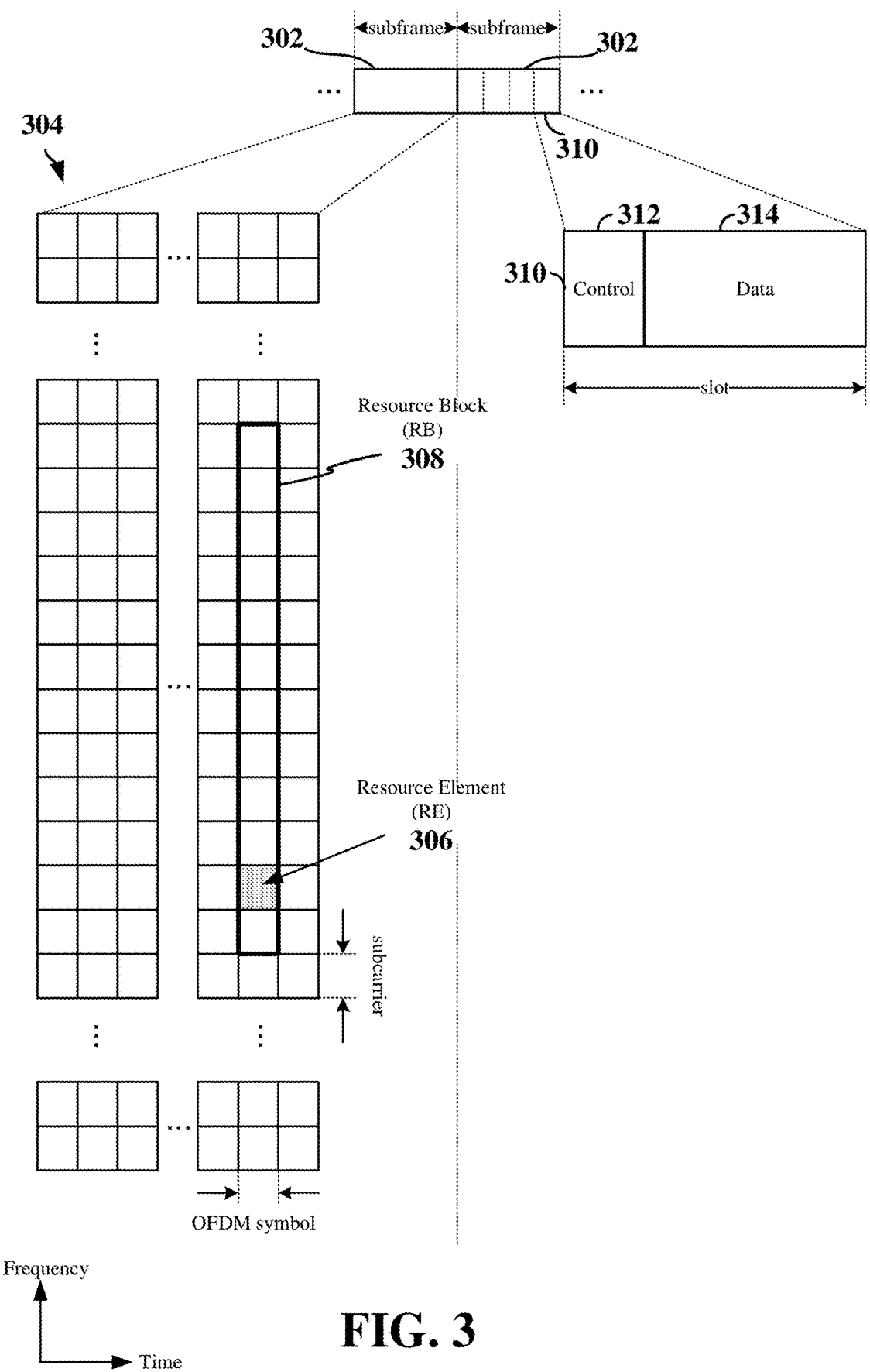
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
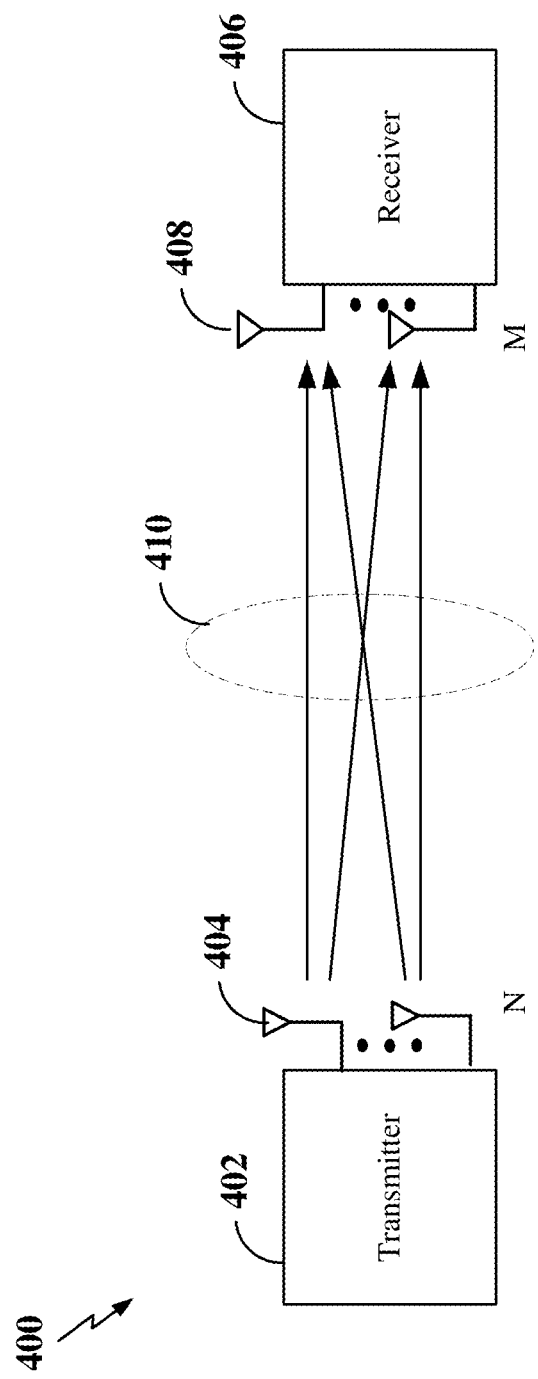
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO and/or beamforming system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as an SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In addition to L1 measurement reports, a UE can further utilize the reference signal(s) to estimate the channel quality of the channel between the base station and the UE. For example, the UE may measure the SINR of each received CSI-RS and generate a CSI report based on the measured SINR. The CSI report may include, for example, a channel quality indicator (CQI), rank indicator (RI), precoding matrix indicator (PMI), and/or strongest layer indicator (SLI). The scheduling entity may use the CSI report to select a rank for the scheduled entity (e.g., based on the RI), along with a precoding matrix (e.g., based on the PMI) and an MCS (e.g., based on the CQI) to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The SLI may be utilized to indicate which column of the precoding matrix of the reported PMI corresponds to the strongest layer codeword corresponding to the largest reported wideband CQI.

Figure 5:
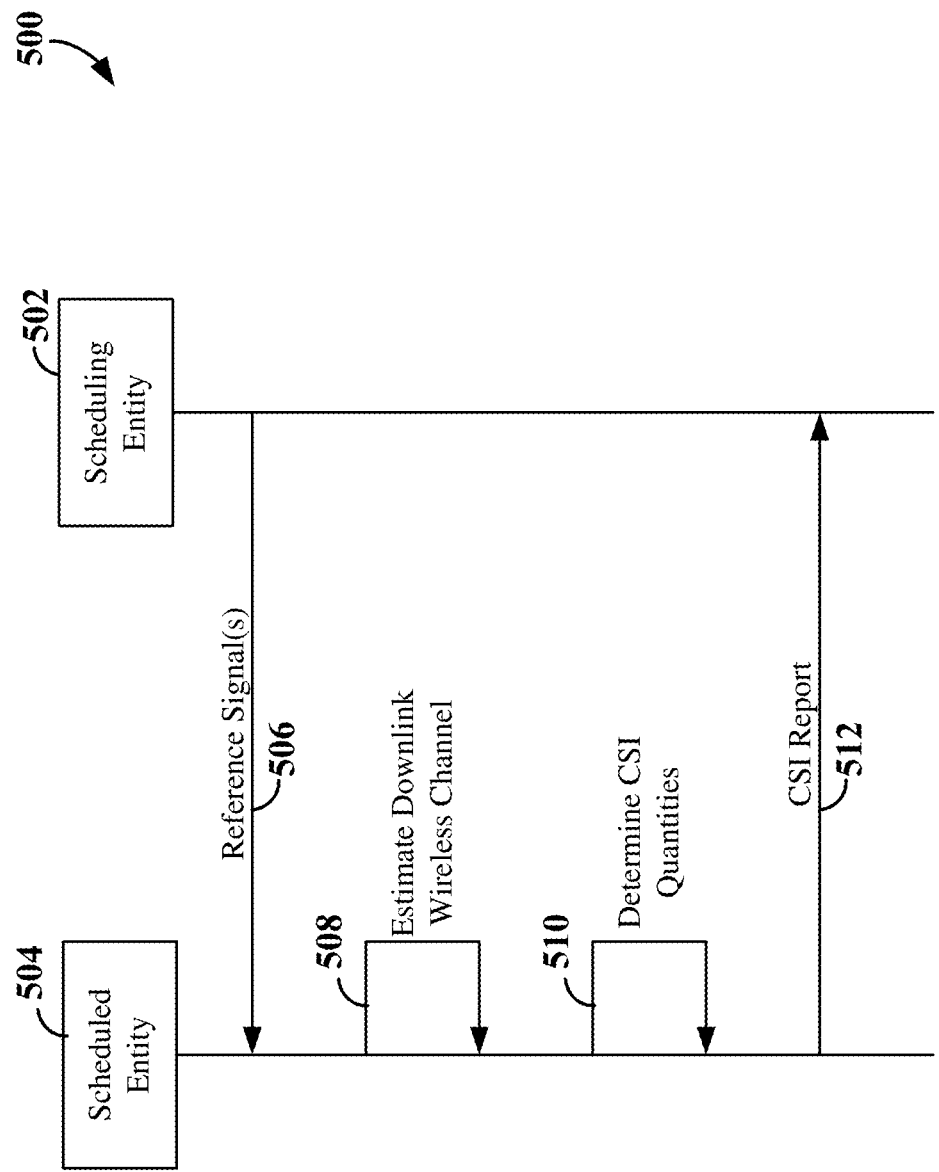
FIG. 5 is a signaling diagram illustrating exemplary signaling between a scheduling entity and a scheduled entity to provide channel state feedback (CSF) according to some aspects.

FIG. 5 is a signaling diagram illustrating exemplary signaling between a scheduling entity 502 and a scheduled entity 504 to provide channel state feedback (CSF) within a wireless network 500. In the illustrated scenario, the scheduled entity 504 can provide a CSI report to the scheduling entity 502. The wireless network 500 may correspond, for example, to the RAN 104 or 200 shown in FIG. 1 or 2. The scheduling entity 502 may correspond, for example, to a base station (e.g., gNB or eNB) or other scheduling entity as shown in FIGS. 1 and/or 2. The scheduled entity 504 may correspond, for example, to a UE or other scheduled node as shown in FIGS. 1 and/or 2.

At 506, the scheduling entity 502 may transmit a reference signal, such as a CSI-RS, to the scheduled entity 504. In some examples, the reference signal may include a plurality of reference signals. Reference signals may be transmitted via a respective channel measurement resource. Channel measurement resources may include time-frequency resources, along with a beam direction, within which a particular reference signal can be transmitted. For example, channel measurement resources may include a non-zero-power (NZP) CSI-RS resource. NZP resources can be utilized for channel measurement, along with one or more interference measurement resources that may be utilized for interference measurements. Interference measurement resources may include a zero-power (ZP) CSI-RS resource and an NZP CSI-RS resource with similar properties as the NZP CSI-RS resource utilized for channel measurement. In addition, each reference signal may include a number of pilots allocated within the respective channel measurement resource.

At 508, the scheduled entity 504 can estimate the downlink wireless channel from the reference signal(s). For example, the scheduled entity 504 may measure the SINR of one or more of the reference signals to obtain a downlink channel estimate of the downlink wireless channel.

At 510, the scheduled entity 504 may estimate various CSI quantities from the downlink channel estimate. In an aspect, the scheduling entity 502 may determine which CSI quantities are to be reported by the scheduled entity 504 and may indicate to the scheduled entity 504 such CSI quantities to be reported to the scheduled entity 504. For example, the scheduled entity 504 may estimate a RI, PMI, CQI, and SLI from the downlink channel estimate. The CQI may include an index (e.g., a CQI index) ranging, for example, from 0 to 15. The CQI index may indicate, for example, the highest MCS at which the Block Error Rate (BLER) of the channel does not exceed 10%. Once estimated, the CSI quantities can be fed back. For example, at 512, the scheduled entity 504 may transmit a CSI report, including the determined CSI quantities to the scheduling entity 502.

The scheduling entity 502 and scheduled entity 504 may each support different types of CSI reports (including L1 measurement reports) and/or different types of measurements. For example, self-contained CSI (e.g., CSI is transmitted back to the scheduling entity 502 in the same slot as the CSI-RS is transmitted from the scheduling entity) or non-self-contained CSI (e.g., CSI is transmitted back to the scheduling entity 502 in a later slot than the slot in which the CSI-RS is transmitted from the scheduling entity) may be supported. To distinguish between the different report/measurement types and measurement configurations, CSI-RS pilots may be mapped to specific resource elements (REs) and ports for each of the report/measurement types and report/measurement configurations.

Figure 6:
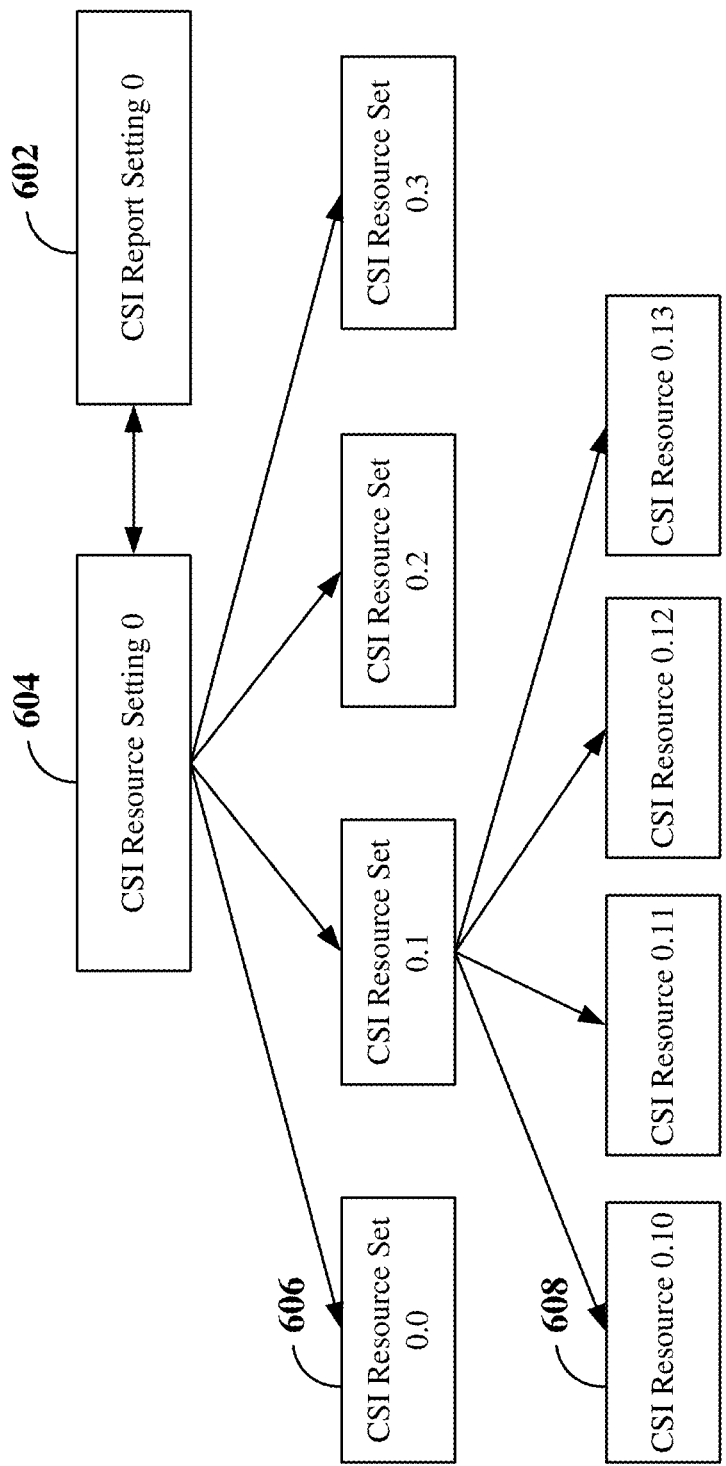
FIG. 6 is a diagram illustrating an example of channel state information (CSI) resource mapping according to some aspects.

FIG. 6 illustrates an exemplary CSI resource mapping to support different report/measurement configurations. The CSI resource mapping includes CSI report settings 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI Resource Setting 0) and a single CSI report setting (e.g., CSI Report Setting 0) are illustrated. However, it should be understood that any suitable number of CSI resource settings 604 and CSI report settings 602 may be supported.

Each CSI report setting 602 may include a reportQuantity (hereinafter referred to as a report metric) that indicates, for example, the specific CSI parameters and granularity thereof (e.g., wideband/sub-band CQI, PMI, RI, LI, etc.), or L1 quantities (e.g., L1-RSRP, L1-SINR) to include in a CSI report. The CSI report setting 602 may further indicate a periodicity of the CSI report. For example, the CSI report setting 602 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 602 may further include a respective priority and other suitable parameters.

Each CSI report setting 602 may be linked to a CSI resource setting 604. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource settings 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters.

Each CSI resource 608 indicates the particular beam (e.g., ports), frequency resource, and OFDM symbol on which the reference signal may be measured by the wireless communication device. For example, each CSI resource 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective beam identifier (ID). The beam ID may identify not only the particular beam (e.g., ports), but also the resources on which the reference signal may be measured. For example, the beam ID may include a CSI-RS resource indicator (CRI) or an SSB resource indicator (SSBRI).

A scheduling entity may configure a scheduled entity with one or more CSI report settings 602 and CSI resource settings 604 via, for example, radio resource control (RRC) signaling. The CSI report setting 602 including the associated CSI resource setting 604 may be signaled as a CSI report configuration information element (IE) (e.g., CSI-ReportConfig IE). The CSI-ReportConfig IE is used to configure a CSI report for a scheduled entity in a cell. For example, the scheduling entity may configure the scheduled entity with a list of periodic CSI report settings 602 indicating the associated CSI resource set 606 that the scheduled entity may utilize to generate periodic CSI reports. As another example, the scheduling entity may configure the scheduled entity with a list of aperiodic CSI report settings in a CSI-AperiodicTriggerStateList. Each trigger state in the CSI-AperiodicTriggerStateList may include a list of aperiodic CSI report settings 602 indicating the associated CSI resource sets 606 for channel (and optionally interference) measurement. As another example, the scheduling entity may configure the scheduled entity with a list of semi-persistent CSI report settings in a CSI-SemiPersistentOnPUSCH-TriggerStateList. Each trigger state in the CSI-SemiPersistentOnPUSCH-TriggerStateList may include one CSI report setting 602 indicating the associated CSI resource set 606. The scheduling entity may then trigger one or more of the aperiodic or semi-persistent trigger states using, for example, DCI. As indicated above, a MAC-CE may be used to activate or deactivate a semi-persistent CSI report setting 602 for a CSI report sent on the PUCCH.

Figure 7:
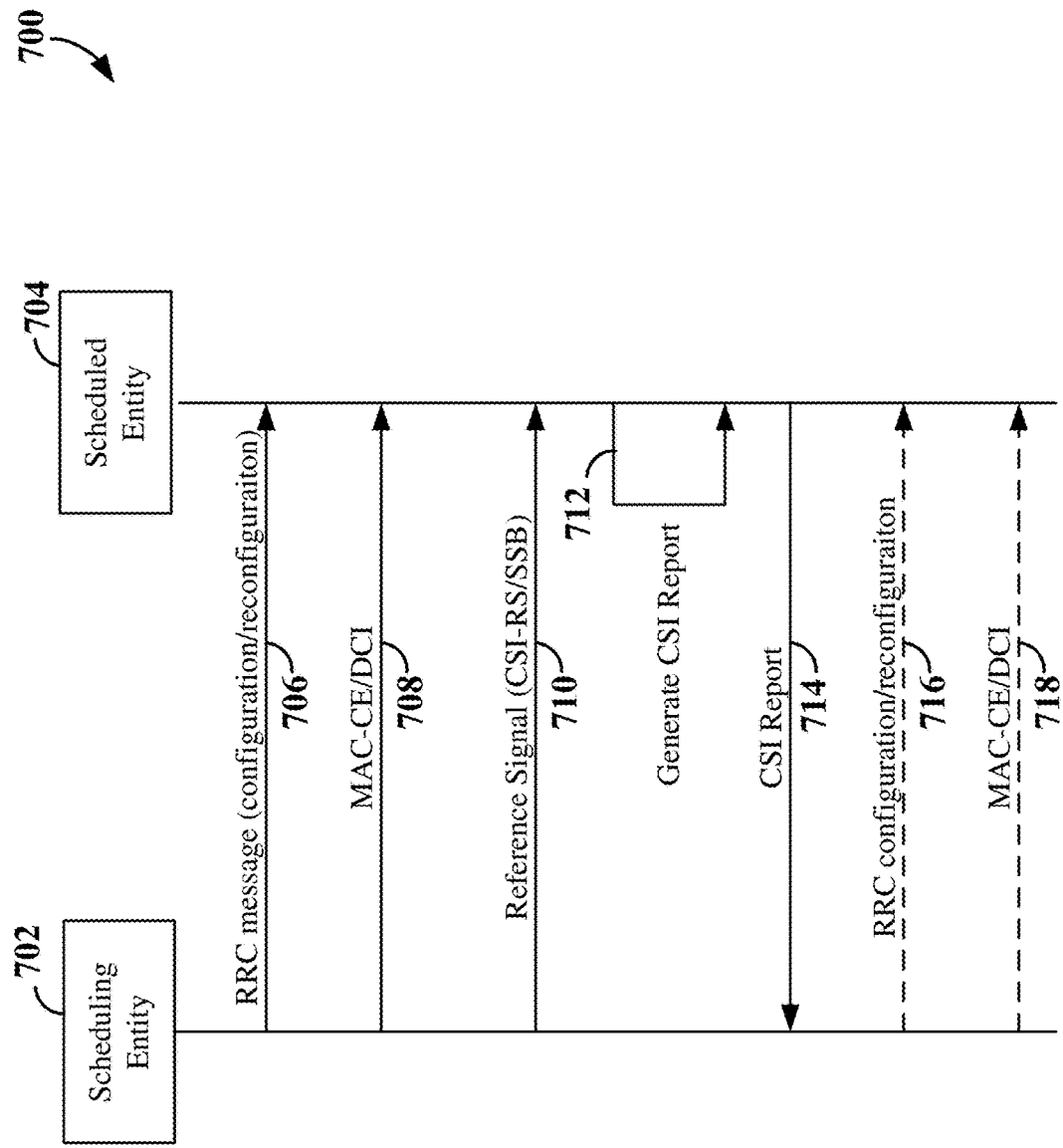
FIG. 7 is a signaling diagram illustrating exemplary signaling between a scheduling entity and a scheduled entity according to some aspects.

According to some aspects, the CSI report setting(s) 602 and CSI resource setting(s) 604 for a scheduled entity may be configured by the scheduling entity. For example, the scheduling entity may transmit a configuration message that includes a report metric indicating at least one report quantity value (e.g., CQI, RI, PMI, LI, and/or L1 measurement) that the scheduled entity is to report in a CSI report generated by the scheduled entity. FIG. 7 is a signaling diagram illustrating exemplary signaling between a scheduling entity 702 and a scheduled entity 704 to configure the scheduled entity 704 for reporting a CSI report within a wireless network 700. The wireless network 700 may correspond, for example, to the RAN 104 or 200 shown in FIG. 1 or 2. The scheduling entity 702 may correspond, for example, to a base station (e.g., gNB or eNB) or another scheduling entity as shown in FIGS. 1, 2, and/or 5. The scheduled entity 704 may correspond, for example, to a UE or another scheduled node as shown in FIGS. 1, 2 and/or 5.

At 706, the scheduling entity 702 may transmit an RRC message to configure the scheduled entity 704 with a CSI report setting (e.g., CSI report setting 602) and a CSI resource setting (e.g., CSI resource setting 604). The RRC message may be an RRC configuration message for configuring the scheduled entity with the CSI report setting or may be an RRC reconfiguration message for reconfiguring the scheduled entity 704 with updated CSI report settings. Thus, the scheduling entity 702 may have control over what the scheduled entity 704 will report and what resources on which the CSI reporting will be based. The CSI report setting may include a report metric that indicates report quantity values to be reported by the scheduled entity 704. For example, types of the report quantity values may include, for example, L1-RSRP, L1-SINR, PMI, CQI, RI, etc.

At 708, the scheduling entity 702 may transmit a MAC-CE and/or DCI to trigger the scheduled entity 704 to report a CSI report. As discussed above, the CSI report setting may indicate whether the CSI report should be generated periodically, aperiodically, or semi-persistently. For example, semi-persistent CSI reports sent on the PUCCH may be activated or deactivated using a MAC-CE. Semi-persistent CSI reports sent on the PUSCH may be triggered using DCI. Aperiodic CSI reports sent on the PUCCH or PUSCH may be triggered using DCI, and additionally by MAC-CE.

At 710, the scheduling entity 702 transmits a reference signal to the scheduled entity 704. The reference signal may include a CSI-RS or an SSB, which is signaled via a respective beam of the scheduling entity 702. As discussed above, for example, SSBs may be transmitted on the wider beams, whereas CSI-RSs may be transmitted on the narrower beams.

At 712, the scheduled entity 704 may generate a CSI report in accordance with the CSI settings (e.g., CSI report setting and CSI resource setting) based on measurements obtained from the received reference signal(s). For example, the scheduled entity 704 may measure the SINR or RSRP of one or more of the reference signals to obtain a downlink channel estimate of the downlink wireless channel and estimate various CSI quantities from the downlink channel estimate. For example, the scheduled entity 704 may estimate a RI, PMI, CQI, SLI, and/or L1 measurements from the downlink channel estimate.

At 714, the scheduled entity 704 may then transmit the CSI report, including the estimated CSI report quantity values, to the scheduling entity 702. Based on the CSI report, the scheduling entity 702 may configure its transmission settings.

At 716, the scheduling entity 702 may transmit another RRC message to the scheduled entity 704, to update information related with configuring the UE for CSI reporting. At 718, the scheduling entity 702 may transmit a MAC-CE and/or DCI to trigger the scheduled entity 704 to report another CSI report, based on the updated information sent at 716 via the RRC message.

As discussed above, the scheduling entity 702 may configure the scheduled entity with CSI report settings indicating a report metric to report in a CSI report and an associated CSI resource set that the scheduled entity 704 may utilize to generate the CSI report. Based on the CSI report setting, the UE may be configured to report one of the report metrics associated with a downlink bandwidth part. For example, the report metric reported by the UE for the associated downlink bandwidth part may be one of the report metrics including: 'none', 'cri-RI-PMI-CQI' 'cri-RI-i1', 'cri-RI-i1-CQI', 'cri-RI-CQI', 'cri-RSRP', 'cri-SINR', 'ssb-Index-RSRP,' and 'ssb-Index-SINR.'

In addition, the UE's approach in generating a CSI report may be specified when the gNB configures the UE for the CSI report. In an aspect, the UE may be configured to calculate CSI parameters assuming particular dependencies between CSI parameters, if such CSI parameters are reported in the CSI report. For example, at least the following four dependencies between the CSI parameters to be reported may be assumed. The LI may be calculated conditioned on the reported CQI PMI, RI, and CRI. The CQI may be calculated conditioned on the reported PMI, RI, and CRI. The PMI may be calculated conditioned on the reported RI and CRI. The RI may be calculated conditioned on the reported CRI.

In an example, the CSI report configuration IE may be represented as a CSI-ReportConfig IE. The CSI-ReportConfig IE is used to configure a CSI report on a cell with which the CSI-ReportConfig IE is associated. For example, the CSI-ReportConfig IE may be used to configure a periodic or semi-persistent report sent on a PUCCH on the cell with which the CSI-ReportConfig is associated, or to configure a semi-persistent or aperiodic report sent on a PUSCH and triggered by DCI received on the cell with which the CSI-ReportConfig is associated. If the DCI is used, the cell on which the CSI report is sent may be determined based on the DCI received by the UE.

In this example, the CSI report configuration IE may include a resourceForChannelMeasurement IE to indicate a resource set for a channel measurement. The CSI report configuration IE may also include an optional resource IE, such as a csi-IM-ResourceForInterference IE to indicate a resource set for an interference measurement and an nzp-CSI-RS-ResourceForInterference IE to indicate a nonzero power resource set for an interference measurement. The CSI report configuration may further include a reportQuantity field that indicates a report metric based on which the UE may make measurements to report a report quantity value in a CSI report.

With advancement of wireless technologies, one or more base stations each having multiple antenna panels and/or by multiple transmission reception points (TRPs) are being developed and UE communication with such base stations is studied. The multiple panels and/or the multiple TRPs may be implemented to achieve full duplex, especially in NR communications, as discussed in the examples below.

In a multi-panel situation with multiple antenna panels or in a multi-transmission reception point (TRP) configuration, UE configurations for CSI reporting may be performed separately for each antenna panel or each TRP. For example, depending on link conditions or panel/TRP characteristics associated with different panels/TRPs, different report metrics for CSI reporting may be respectively configured for the different panels/TRPs for beam management and/or CSI reporting. Thus, for each panel/TRP, a particular report metric associated with a corresponding panel/TRP may be configured.

Generally, to configure a report metric specific for each panel/TRP, a separate CSI setting (e.g., a CSI resource setting and a CSI report setting) may be configured for each panel/TRP. For example, for each panel/TRP, a separate CSI report setting and an associated CSI resource setting may be transmitted to a UE to configure the UE. Hence, a number of CSI report settings transmitted to configure the UE increases as a number of antenna panels/TRPs increases. For example, the number of CSI report settings may correspond to the number of antenna panels/TRPs. This contributes to the increased amount of resources used for CSI reporting in the multi-panel/multi-TRP situation, as multiple CSI report settings for multiple report metrics associated with multiple panels/TRPs need to be communicated. For example, with a large number of antenna panels/TRPs, a large number of CSI report settings and associated CSI resource settings may be transmitted, which in turn results in a large number of CSI reports being transmitted. Therefore, the large number of CSI report settings and associated CSI resource settings being communicated due to multiple panels/TRPs may be burdensome to the communication system and may cause an inefficient use of resources.

According to some aspects of the disclosure, instead of including a single report metric per CSI report setting and transmitting separate CSI report settings for each panel/TRP, multiple report metrics for multiple resource sets may be included per CSI report setting. The multiple resource sets may be respectively associated with the multiple panels/ TRPs. Thus, for example, as few as one CSI report setting may be communicated to the UE to achieve CSI reporting for multiple panels/TRPs, instead of performing multiple transmissions of multiple CSI report settings for respective report metrics. In the CSI report setting with multiple report metrics respectively for multiple panels/TRPs, a separate respective report metric may be associated with each panel, TRP, or resource, such that report quantity values respectively associated with each of the report metrics may be reported by the UE in a single CSI report. Because a single CSI report setting may be transmitted (e.g., in a single transmission) to communicate multiple report metrics for multiple panels/TRPs/resources instead of involving multiple transmissions of multiple CSI report settings, a process to configure the UE for CSI reporting is simplified and resources associated with configuring the UE may be utilized efficiently.

Figure 8:
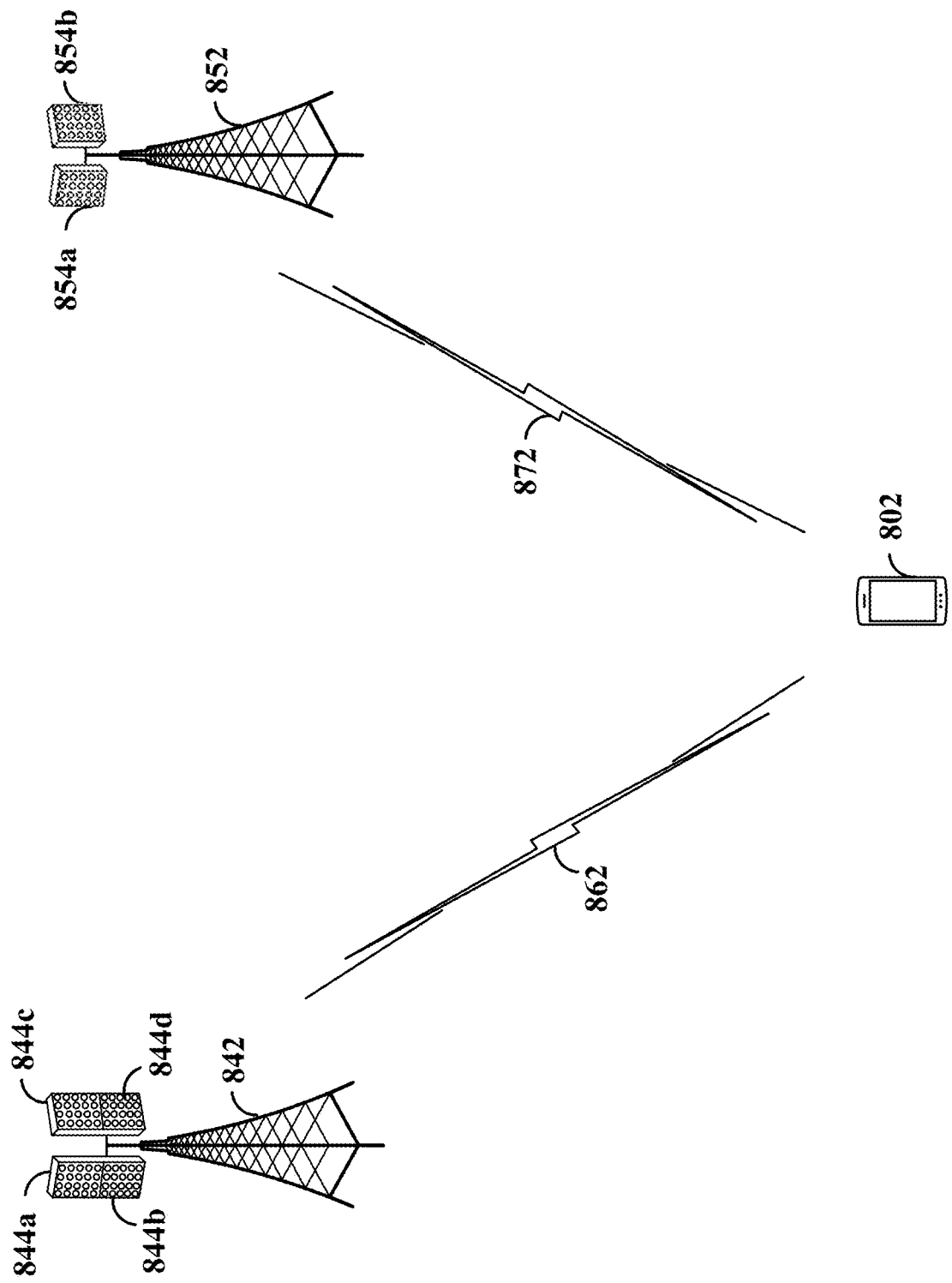
FIG. 8 is an example diagram illustrating communication between multiple panels/TRPs and a user equipment, according to some aspects.

FIG. 8 is an example diagram 800 illustrating communication between multiple panels/TRPs and a UE, according to some aspects. A UE 802 may be configured to communicate with a first base station 842 and a second base station 852, each of which may be a respective TRP in a coordinated multi-point (CoMP) network configuration. It is noted that the UE 802 may communicate with any number of TRPs. The first base station 842 is a multi-panel base station with two antenna arrays, each of which including two antenna panels, where one antenna array includes antenna panels 844a and 844b, and the other antenna array includes antenna panels 844c and 844d. The antenna panels 844a and 844b may be in a first antenna array and the antenna panels 844c and 844d may be in a second antenna array of the first base station 842. The first base station 842 may be configured to communicate with the UE 802 over a communication link 862 using, for example, one or more antenna panels (e.g., antenna panels 844c and 844d) of an antenna array of the first base station 842.

For beamformed communication, the antenna elements of an antenna array (e.g., panels 844c and 844d) may be mapped to antenna ports for generation of beams. Here, the term antenna port refers to a logical port (e.g., a beam) over which a signal (e.g., a data stream or layer) may be transmitted. In an example, an antenna array may include 128 antenna elements (e.g., within a 16×8 array) that may be mapped to 32 antenna ports by an 8×1 combiner. For MIMO transmissions, each layer (or data stream) may be mapped to one of the antenna ports. For example, the first base station 842 may maintain a codebook of precoding matrices and map the different transmission layers to a set of antenna ports on the first base station 842 using a selected precoding matrix. The precoding matrix provides the appropriate weightings to be applied to each layer for generation of the respective beam for each layer. The precoding matrix may be selected based on the PMI fed back from the UE 802 in a CSI report. For example, using the PMI, the first base station 842 may select a particular precoding matrix from a codebook for a MIMO transmission.

The second base station 852 is a single-panel base station with two antenna arrays, each including a single antenna panel, where one antenna array includes an antenna panel 854a and the other antenna array includes an antenna panel 854b. The second base station 852 may be configured to communicate with the UE 802 over a communication link 872 using, for example, one of the single-panel antenna arrays 854a or 854b. Although not shown in FIG. 8, the UE 802 may communicate with one or more additional TRPs, each having single-panel or multi-panel antenna arrays.

The first base station 842 may transmit a configuration message to the UE 802 to configure the UE 802 for CSI reporting. The configuration message may indicate multiple report metrics for the UE to report in a CSI report. The configuration message may also indicate CSI resource sets that are respectively associated with the antenna panels (e.g., on one or more TRPs) configured for communication with the UE 802, such as the antenna panels 844c, 844d, and 854a, such that each CSI resource set corresponds to a respective antenna panel of the antenna panels. Each of the report metrics is further associated with at least one corresponding CSI resource set of the CSI resource sets. Further, each report metric of the multiple report metrics may be associated with a respective one of the antenna panels. In an aspect, the configuration message may include one or more of an RRC configuration message, an RRC reconfiguration message, a MAC-CE, and a DCI message.

In an aspect, each of the report metrics includes one or more parameters, such as a CQI, an RI, a PMI, LI, or an L1 measurement type. For example, as discussed above, each report metric may indicate one of: 'none', 'cri-RI-PMI-CQI' 'cri-RI-i1', 'cri-RI-i1-CQI', 'cri-RI-CQI', 'cri-RSRP', 'cri-SINR', 'ssb-Index-RSRP,' and 'ssb-Index-SINR.' In an aspect, the configuration message may further include a report metric set identifier indicating that the multiple report metrics are indicated in a singular fashion in the configuration message. For example, a report metric set identifier may identify a set of two or more report metrics, each associated with one of the antenna panels.

Each of the CSI resource sets indicated in the configuration message may be mapped to a corresponding report metric of the report metrics respectively associated with the CSI resource sets. According to an approach, such mapping may be indicated explicitly, e.g., by using mapping identifiers to indicate the mapping. In an aspect, the configuration message may further include mapping identifiers that indicate mapping of the CSI resource sets with the report metrics, respectively. In an aspect, the mapping identifiers may be transmitted to the UE 802 separately from the configuration message. In this aspect, a base station such as the first base station 842 may transmit mapping identifiers that indicate mapping of the CSI resource sets with the report metrics, respectively. The mapping identifiers may be transmitted, for example, by MAC-CE or DCI. According to another approach, the mapping of the CSI resource sets with the report metrics may be performed implicitly. In an aspect, the report metrics may be indicated in the configuration message (e.g., in a CSI report configuration IE) according to a first order that corresponds to a second order in which the CSI resource sets are indicated, to map each of the report metrics to the at least one corresponding CSI resource set. For example, the report metrics respectively for the antenna panels 844c, 844d, and 854a may be listed in a first order, and the CSI resource sets respectively associated with the report metrics may be listed in a second order, such that a position of each report metric listed in the first order matches a position of a corresponding CSI resource set listed in the second order, e.g., in the configuration message.

In an aspect, each of the report metrics may be further associated with a respective one of CSI resources within the respective one of the antenna panels. For example, each antenna panel may be associated with one or more CSI resources that are associated with a particular report metric. In one example, as discussed above, each CSI resource set includes multiple CSI resources, and thus multiple CSI resources may be associated with a CSI resource set associated with a particular report metric and a particular antenna panel.

In an aspect, the configuration message may include a CSI report configuration IE for configuring a CSI report setting, where the CSI report configuration IE includes the set of report metrics respectively associated with the antenna panels. In this example, the reportQuantity field of the CSI report configuration IE according to an aspect of the disclosure may include a set of report metrics respectively associated with multiple antenna panels.

In an aspect, the at least one corresponding CSI resource set associated with each of the report metrics may include at least one of a channel measurement resource or an interference measurement resource. For example, for each report metric, a CSI resource set may be assigned as a channel measurement resource used for measuring a channel, and another CSI resource set may be assigned as an interference measurement resource for measuring an interference. For example, the CSI report configuration IE may include resource sets for a channel measurement, which are respectively associated with the report metrics. In this example, the resource sets for the channel measurement may be indicated in a resourceForChannelMeasurement IE of the CSI report configuration IE. For example, the CSI report configuration IE may also include resource sets for interference measurements, which are respectively associated with the report metrics. In this example, the resource sets for the channel interference may be indicated in a csi-IM-ResourceForInterference IE and/or a nzp-CSI-RS-ResourceForInterference IE of the CSI report configuration IE.

In an aspect, the at least one corresponding CSI resource set associated with each of the report metrics may include either the channel measurement resource or both of the channel measurement resource and the interference measurement resource based on a respective report metric of the report metrics. For example, some report quantity values (e.g., report quantity values related to a SINR) are generated based on a channel measurement and an interference measurement while other report quantity values (e.g., report quantity values related to an RSRP) are generated based on a channel measurement without an interference measurement. Therefore, in one example, the channel measurement resource may exist for all report metrics, but the interference measurement resource may exist only for some report metrics. In another example, both the channel measurement resource and the interference measurement resource may exist for all report metrics, and the interference measurement resource may be ignored when generating certain report quantity values that do not rely on an interference measurement.

The first base station 842 may transmit at least one reference signal via at least one of the antenna panels 844c and 844d to the UE 802 in accordance with the configuration message. For example, the first base station 842 may transmit a reference signal via the antenna panel 844c and another reference signal via the antenna panel 844d. In addition, the antenna panel 854a of the second base station 852 may transmit a respective reference signal to the UE 802. For example, in FIG. 8, because the antenna panels 844a, 844b, and 854b are facing away from the UE 802, none of the antenna panels 844a, 844b, and 854b may be used to transmit a reference signal to the UE 802.

Hence, the UE 802 may receive reference signals from multiple antenna panels, respectively, where each reference signal is from a respective antenna panel of the multiple antenna panels. For example, the UE 802 may receive reference signals from the antenna panels 844c and 844d of the first base station 842 and the antenna panel 854a of the second base station 852, respectively. For example, the UE 802 may receive a reference signal from the antenna panel 844c, may receive a reference signal from the antenna panel 844d, and may receive a reference signal from the antenna panel 854a.

After receiving the reference signals respectively from the multiple antenna panels, the UE 802 performs measurements of the reference signals according to the report metrics respectively, where each of the report metrics is associated with the at least one corresponding CSI resource set of the CSI resource sets. Based on the measurements of the reference signals, the UE 802 generates report quantity values respectively associated with the report metrics. For example, the UE 802 may generate the report quantity values respectively based on the measurements of the reference signals. For example, for a reference signal associated with a particular antenna panel and/or a particular resource set, the UE 802 performs a measurement of the reference signal based on a report metric associated with the particular antenna panel and/or the particular resource set, to generate a report quantity value for the report metric.

After generating the report quantity values, the UE 802 transmits a CSI report that includes the report quantity values generated based on the reference signals, respectively. The CSI report may be transmitted to one or more base stations, such as the first base station 842 and the second base station 852.

The first base station 842 receives, from the UE 802, a CSI report that includes report quantity values respectively associated with the report metrics. For example, the CSI report received by the first base station 842 may include report quantity values that are respectively associated with the report metrics associated with the antenna panels 844c and 844d of the first base station 842 and a report metric associated with antenna panel 854a of the second base station 852. Based on these report quantity values, the first base station 842 may configure transmission settings of the antenna panels 844c and 844d, respectively. That is, for example, the first base station 842 may configure the antenna panel 844c based on the report quantity value of the report metric associated with the antenna panel 844c, and may configure the antenna panel 844d based on the report quantity value of the report metric associated with the antenna panel 844*d*. The second base station 852 may also receive the CSI report from the UE 802 or receive the CSI report from the first base station 842, and configure the antenna panel 854*a* based on the report quantity values of the report metric associated with antenna panels 854*a*.

In an aspect, after configuring the UE with the configuration message indicating the report metrics, the report metrics for the CSI reporting may be updated. The base station such as the first base station 842 may update the report metrics after transmitting the configuration message, and transmit the updated report metrics to the UE 802. The updated report metrics may be transmitted via at least one of a MAC-CE or DCI. After the UE 802 receives the updated report metrics (and at least one additional reference signal), the UE 802 may generate second report quantity values respectively associated with the updated report metrics. The second report quantity values may be based on measurement of at least one reference signal, which may include the same set of reference signals (e.g., CSI-RS or SSB) as previously used or a different set of reference signals (e.g., CSI-RS or SSB). Subsequently, the UE 802 transmits a second CSI report that includes the second report quantity values respectively associated with the updated report metrics. The second CSI report may be transmitted to one or more base stations, such as the first base station 842 and the second base station 852.

In an aspect, the base station such as the first base station 842 may update the report metrics by updating the mapping identifiers to generate updated mapping identifiers that indicate mapping of the CSI resource sets with the updated report metrics. In this aspect, the base station may transmit the updated report metrics by transmitting the updated mapping identifiers, and the UE 802 may receive the updated report metrics by receiving the updated mapping identifiers.

In an aspect, the base station such as the first base station 842 may update the report metrics by updating a report metric set ID to determine an updated report metric set ID indicating the updated report metrics. In this aspect, the base station may transmit the updated report metrics to the UE 802 by transmitting the updated report metric set ID. For example, several sets of report metrics may be preconfigured and may be assigned respective report metric set IDs (e.g., by the base station). In this example, the base station may update the report metric set ID by selecting a new report metric set ID with new set of report metrics, and then transmit the new report metric set ID as the updated report metric set ID to the UE 802 (e.g., in response to the update request).

In an aspect, the UE 802 may trigger updating of the report metrics. In this aspect, the UE 802 may transmit an update request to the base station, such as the first base station 842. In response to the update request, the base station such as the first base station 842 may update the report metrics and transmit the updated report metrics to the UE 802.

Figure 9:
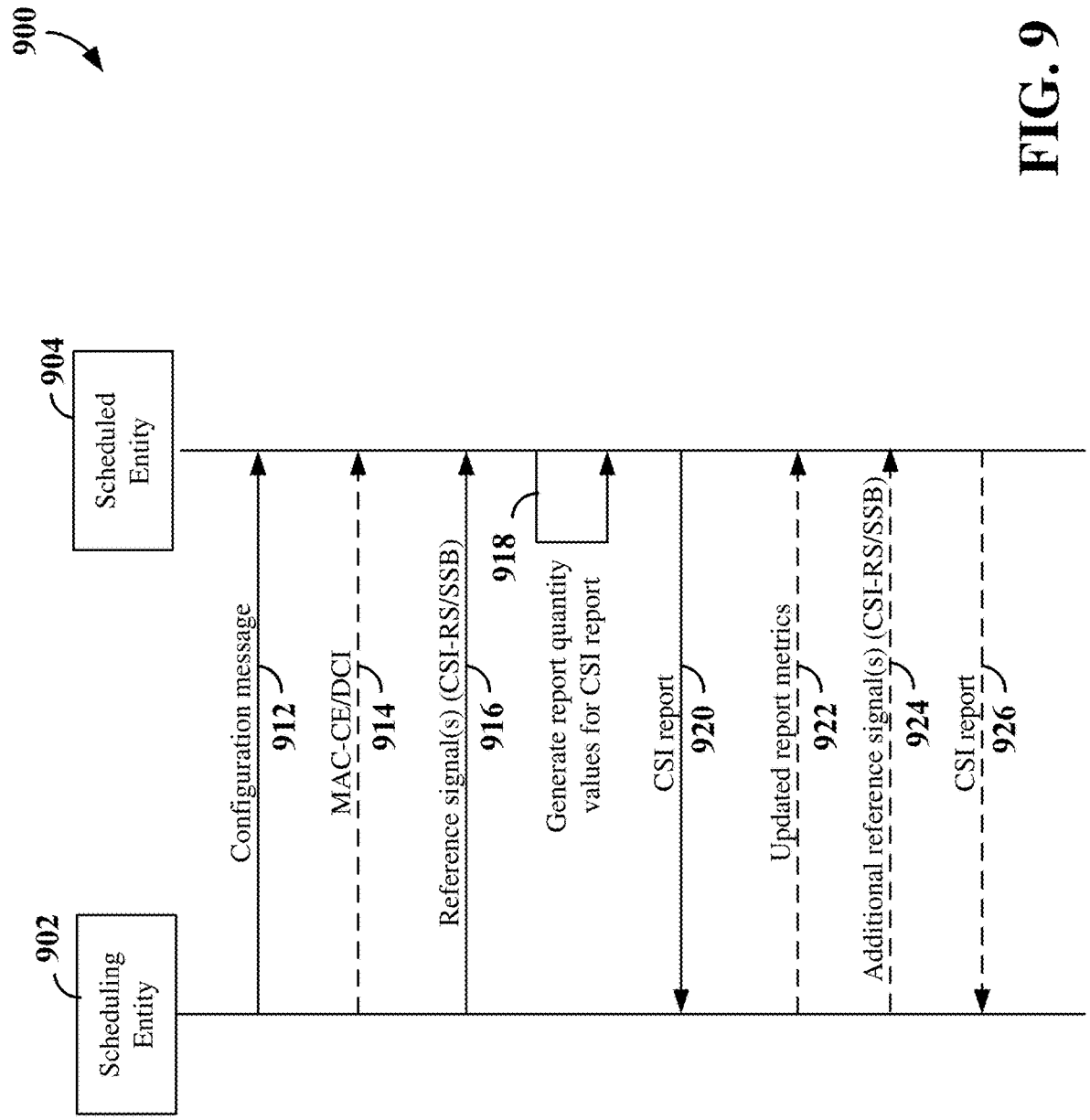
FIG. 9 is a signaling diagram illustrating exemplary signaling between a scheduling entity and a scheduled entity to configure the scheduled entity for CSI reporting within a wireless network according to some aspects

FIG. 9 is a signaling diagram illustrating exemplary signaling between a scheduling entity 902 and a scheduled entity 904 to configure the scheduled entity 704 for CSI reporting within a wireless network 900 according to some aspects. The wireless network 900 may correspond, for example, to the RAN 104 or 200 shown in FIG. 1 or 2. The scheduling entity 902 may correspond, for example, to a base station (e.g., gNB or eNB) or other scheduling entity as shown in FIGS. 1 and/or 2, or the first base station 842 as shown in FIG. 8. The scheduled entity 904 may correspond, for example, to a UE or other scheduled node as shown in FIGS. 1 and/or 2 or the UE 802 as shown in FIG. 8.

At 912, the scheduling entity 902 may transmit a configuration message indicating multiple report metrics. Each of the report metrics is associated with at least one corresponding CSI resource set of CSI resource sets associated with the multiple antenna panels configured for communication with the scheduled entity 904. Hence, if the scheduling entity 902 utilizes multiple antenna panels, instead of transmitting multiple configuration messages for multiple report metrics (e.g., indicated in multiple CSI report settings) and multiple CSI resource sets (e.g., indicated in multiple CSI resource settings), a single configuration message indicating the multiple report metrics and the multiple CSI resource sets may be transmitted to configure the scheduled entity 904 for CSI reporting for the multiple antenna panels. In an aspect, each of the report metrics may be associated with a respective one of the antenna panels configured for communication with the scheduled entity 904.

At 914, the scheduling entity 902 may transmit a MAC-CE and/or DCI to trigger the scheduled entity 904 to report a CSI report. For example, semi-persistent CSI reports sent on the PUCCH may be activated or deactivated using a MAC-CE. Semi-persistent CSI reports sent on the PUSCH may be triggered using DCI. Aperiodic CSI reports sent on the PUCCH or PUSCH may be triggered using DCI, and additionally by a MAC-CE.

At 916, the scheduling entity 902 may transmit one or more reference signals to the scheduled entity 904 via one or more antenna panels of the scheduling entity 902. For example, if the scheduling entity 902 includes multiple antenna panels, each of the multiple antenna panels may separately transmit one or more reference signals to the scheduled entity 904. In an example, another scheduling entity (not shown) may also transmit one or more reference signals to the scheduled entity 904.

At 918, after the scheduled entity 904 receives the reference signals transmitted from the antenna panels of the scheduling entity 902, the scheduled entity 904 may perform measurements of the reference signals respectively according to the report metrics indicated in the configuration message, and generate report quantity values respectively associated with the report metrics based on these measurements. Hence, for example, for a reference signal transmitted via a particular antenna panel and associated with a particular resource set, the scheduled entity 904 may perform a measurement of the reference signal according to a report metric associated with the particular antenna panel and/or the particular resource set, so as to generate a corresponding report quantity value for the particular antenna panel.

At 920, the scheduled entity 904 may transmit to the scheduling entity 902 a CSI report that includes the report quantity values generated at 918. Subsequently, the scheduling entity 902 may configure transmission settings of the antenna panels based on the report quantity values in the CSI report that are associated with the antenna panels, respectively.

Optionally, at 922, the scheduling entity 902 may update the report metrics and transmit the updated report metrics to the scheduled entity 904. In an aspect, the scheduling entity 902 may update the report metrics in response to an update request received from the scheduled entity 904. At 924, the scheduling entity 902 may transmit additional reference signals (e.g., which may include the same set of reference signals used for the original report metrics or a different set of reference signals) to the scheduled entity 904 via the antenna panels, respectively. At 926, the scheduled entity 904 may generate second report quantity values respectively associated with the updated report metrics, and transmit a second CSI report including the second report quantity values to the scheduling entity 902.

Figure 10:
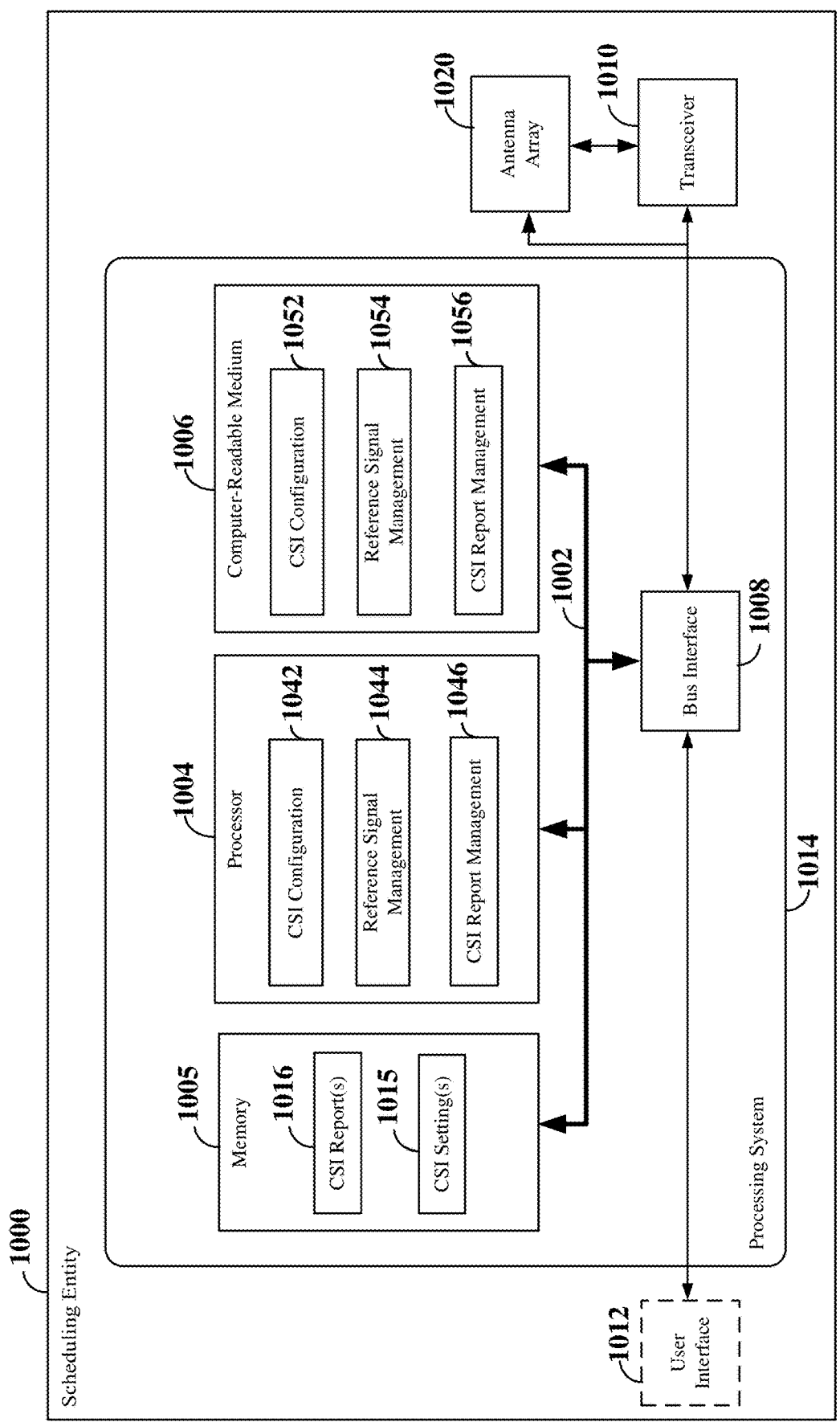
FIG. 10 is a block diagram illustrating an example of a hardware implementation for a scheduling entity employing a processing system according to some aspects.

FIG. 10 is a conceptual diagram illustrating an example of a hardware implementation for an exemplary scheduling entity 1000 employing a processing system 1014. For example, the scheduling entity 1000 may be a base station (e.g., gNB or eNB) or other scheduling entity as illustrated in any one or more of FIGS. 1, 2, 8 and/or 9.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes described below. The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). The bus interface 1008 further provides an interface between the bus 1002 and one or more antenna array(s) 1020 (e.g., antenna panels). A user interface 1012 (e.g., keypad, display, touchscreen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable storage medium 1006. The software, when executed by the processor 1004, causes the processing system 1014 to perform the various functions described below for any particular apparatus. The computer-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006.

The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product. In some examples, the computer-readable storage medium 1006 may be part of the memory 1005. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include CSI configuration circuitry 1042, configured to perform functions related to generating and transmitting a configuration message and/or report metrics used to configure a UE for CSI reporting. The CSI configuration circuitry 1042 may be configured to execute CSI configuration software 1052 stored in the computer-readable storage medium 1006 to implement one or more of the functions described herein.

In various aspects of the present disclosure, the CSI configuration circuitry 1042 may be configured to transmit, to a UE, a configuration message indicating a plurality of report metrics, where each of the plurality of report metrics is associated with at least one corresponding CSI resource set of a plurality of CSI resource sets associated with a plurality of antenna panels configured for communication with the UE. Each of the plurality of report metrics may be associated with a respective one of the plurality of antenna panels. The plurality of report metrics and/or the plurality of CSI resource sets may be indicated in CSI setting(s) 1015 stored, for example, in memory 1005. For example, the CSI configuration circuitry 1042 may be configured to implement one or more of the functions described below in relation to FIGS. 11 and 12, including, e.g., block 1102 and block 1202.

In addition, the CSI configuration circuitry 1042 may further be configured to update the plurality of report metrics subsequent to transmitting the configuration message and to transmit the updated plurality of report metrics to the UE. For example, the CSI configuration circuitry 1042 may be configured to implement one or more of the functions described below in relation to FIG. 13, including, e.g., block 1306 and 1308.

In an aspect, the CSI configuration circuitry 1042 may further be configured to receive an update request from the UE, where the updating the plurality of report metrics by the CSI configuration circuitry 1042 may be performed in response to the update request. For example, the CSI configuration circuitry 1042 may be configured to implement one or more of the functions described below in relation to FIG. 13, including, e.g., block 1304.

In an aspect, the CSI configuration circuitry 1042 may further be configured to transmit, to the UE, a message including a plurality of mapping identifiers that indicate mapping of the plurality of CSI resource sets with the plurality of report metrics, respectively. For example, the CSI configuration circuitry 1042 may be configured to implement one or more of the functions described below in relation to FIG. 12, including, e.g., block 1204.

The processor 1004 may further include reference signal management circuitry 1044 configured to manage transmission of a reference signal. The reference signal management circuitry 1044 may be configured to execute reference signal management software 1054 stored in the computer-readable storage medium 1006 to implement one or more of the functions described herein.

In some examples, the reference signal management circuitry 1044 may be configured to transmit at least one reference signal via at least one of the plurality of antenna panels to the UE in accordance with the CSI resource setting(s) (e.g., one or more CSI resource sets) associated with the configuration message. For example, the CSI configuration circuitry 1042 may be configured to implement one or more of the functions described below in relation to FIGS. 11 and 12, including, e.g., block 1104 and block 1206.

The processor 1004 may further include CSI report management circuitry 1046 configured to receive from the scheduled entity and process the CSI reports 1016. The CSI report management circuitry 1046 may be configured to execute CSI report management software 1056 stored in the computer-readable storage medium 1006 to implement one or more of the functions described herein.

In some examples, the reference signal management circuitry 1044 may be configured to receive, from the UE, a CSI report that includes report quantity values respectively associated with the plurality of report metrics, where the report quantity values are based on measurement of the at least one reference signal according to the configuration message. The CSI report may be stored as a part of CSI Report(s) 1016 in the memory 1005 for further processing. For example, the CSI configuration circuitry 1042 may be configured to implement one or more of the functions described below in relation to FIGS. 11 and 12, including, e.g., block 1106 and block 1208.

In some examples, the reference signal management circuitry 1044 may be configured to receive, from the UE, a second CSI report that includes second report quantity values respectively associated with the updated plurality of report metrics, where the second report quantity values are determined according to the updated plurality of report metrics. The second CSI report may be stored as a part of the CSI Report(s) 1016 in the memory 1005 for further processing. For example, the CSI configuration circuitry 1042 may be configured to implement one or more of the functions described below in relation to FIG. 13, including, e.g., block 1310.

Figure 11:
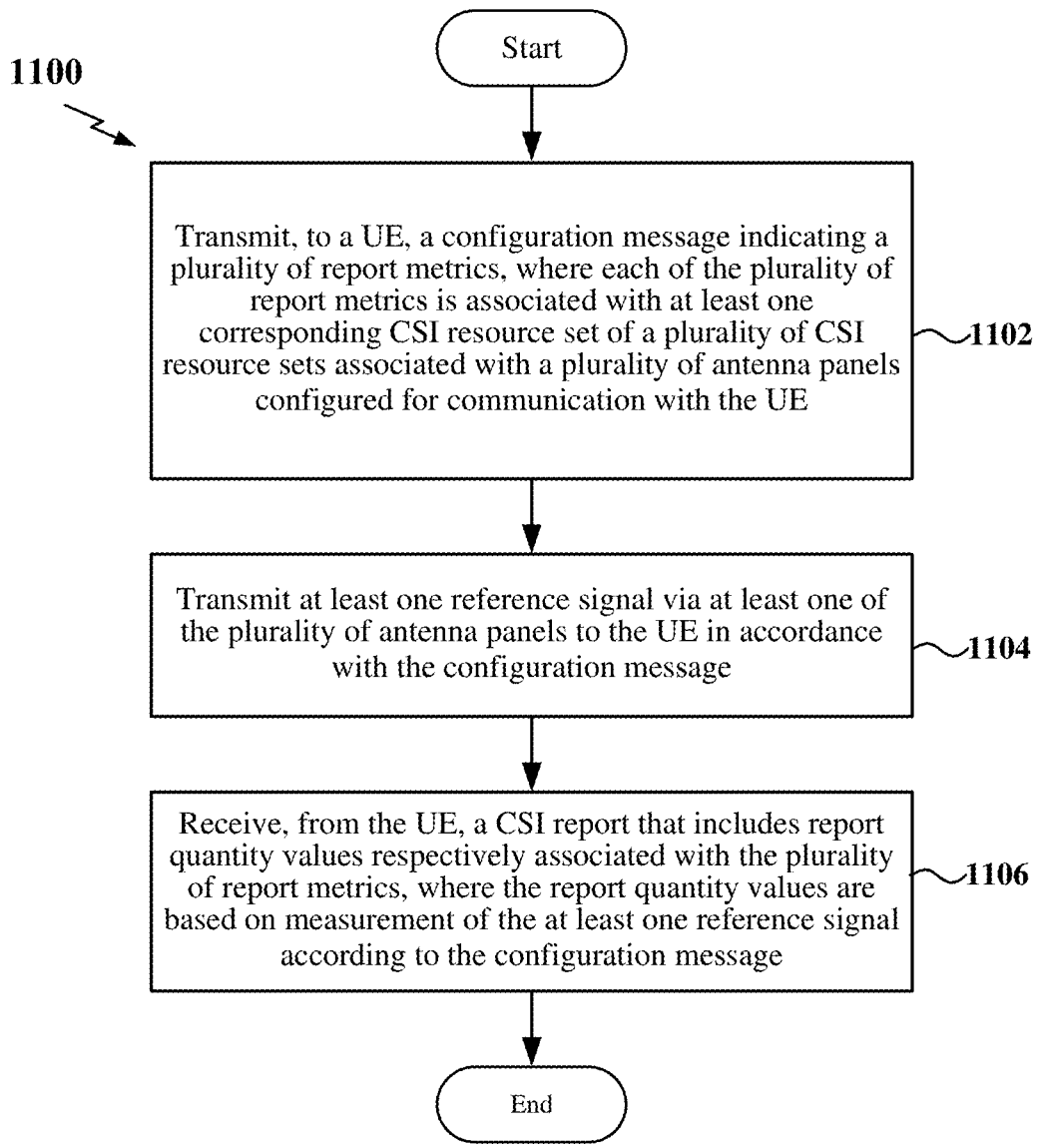
FIG. 11 is a flow chart of an exemplary method for a scheduling entity to optimize a CSI setting for a scheduled entity according to some aspects.

FIG. 11 is a flow chart 1100 of a method of wireless communication by a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1000, as described above and illustrated in FIG. 10, by a processor or processing system, or by any suitable means for carrying out the described functions.

At block 1102, the scheduling entity may transmit, to a UE, a configuration message indicating a plurality of report metrics, where each of the plurality of report metrics is associated with at least one CSI resource set of a plurality of CSI resource sets associated with a plurality of antenna panels configured for communication with the UE. In an aspect, each of the plurality of report metrics may be associated with a respective one of the plurality of antenna panels. In an aspect, each of the plurality of report metrics may include at least one of a CQI, an RI, a PMI, a layer indicator, or a layer 1 measurement type. In an aspect, the configuration message may include at least one of an RRC configuration message, an RRC reconfiguration message, a MAC-CE, or a DCI message.

In an aspect, the at least one corresponding CSI resource set associated with each of the plurality of report metrics may include at least one of a channel measurement resource or an interference measurement resource. In an aspect, the at least one corresponding CSI resource set associated with each of the plurality of report metrics may include either the channel measurement resource or both of the channel measurement resource and the interference measurement resource based on a respective report metric of the plurality of report metrics.

In an aspect, the configuration message may further include a report metric set ID indicating the plurality of report metrics. In an aspect, the plurality of antenna panels may be associated with a plurality of TRPs. In an aspect, each of the plurality of report metrics may further be associated with a respective one of a plurality of CSI resources within the respective one of the plurality of antenna panels.

At block 1104, the scheduling entity may transmit at least one reference signal via at least one of the plurality of antenna panels to the UE in accordance with the configuration message.

At block 1106, the scheduling entity may receive, from the UE, a CSI report that includes report quantity values respectively associated with the plurality of report metrics, wherein the report quantity values are based on measurement of the at least one reference signal according to the configuration message.

Figure 12:
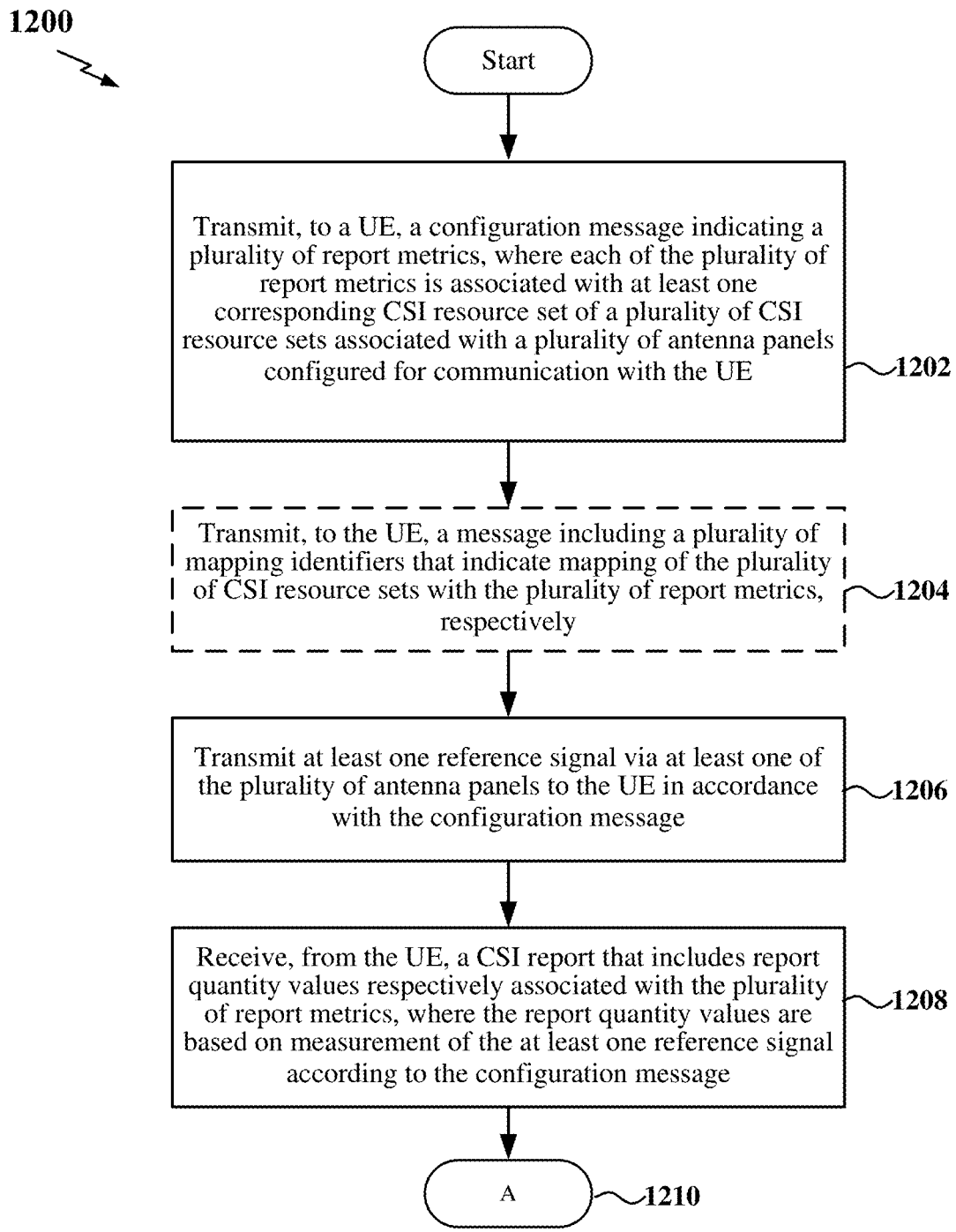
FIG. 12 is a flow chart of another exemplary method for a scheduling entity to optimize a CSI setting for a scheduled entity according to some aspects.

FIG. 12 is a flow chart 1200 of a method of wireless communication by a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1000, as described above and illustrated in FIG. 10, by a processor or processing system, or by any suitable means for carrying out the described functions.

At block 1202, the scheduling entity may transmit, to a UE, a configuration message indicating a plurality of report metrics, where each of the plurality of report metrics is associated with at least one CSI resource set of a plurality of CSI resource sets associated with a plurality of antenna panels configured for communication with the UE. In an aspect, each of the plurality of report metrics may be associated with a respective one of the plurality of antenna panels. In an aspect, each of the plurality of report metrics may include at least one of a CQI, an RI, a PMI, a layer indicator, or a layer 1 measurement type. In an aspect, the configuration message may include at least one of an RRC configuration message, an RRC reconfiguration message, a MAC-CE, or a DCI message.

In an aspect, the at least one corresponding CSI resource set associated with each of the plurality of report metrics may include at least one of a channel measurement resource or an interference measurement resource. In an aspect, the at least one corresponding CSI resource set associated with each of the plurality of report metrics may include either the channel measurement resource or both of the channel measurement resource and the interference measurement resource based on a respective report metric of the plurality of report metrics.

In an aspect, the configuration message may further include a report metric set ID indicating the plurality of report metrics. In an aspect, the plurality of antenna panels may be associated with a plurality of TRPs. In an aspect, each of the plurality of report metrics may further be associated with a respective one of a plurality of CSI resources within the respective one of the plurality of antenna panels.

In an aspect, the configuration message may further include a plurality of mapping identifiers that indicate mapping of the plurality of CSI resource sets with the plurality of report metrics, respectively.

In an aspect, at block 1204, optionally, the scheduling entity may transmit, to the UE, a message including a plurality of mapping identifiers that indicate mapping of the plurality of CSI resource sets with the plurality of report metrics, respectively.

In an aspect, the plurality of report metrics may be indicated in the configuration message according to a first order that corresponds to a second order of the plurality of CSI resource sets to map each of the plurality of report metrics to the at least one corresponding CSI resource set.

At block 1206, the scheduling entity may transmit at least one reference signal via at least one of the plurality of antenna panels to the UE in accordance with the configuration message.

At block 1208, the scheduling entity may receive, from the UE, a CSI report that includes report quantity values respectively associated with the plurality of report metrics, wherein the report quantity values are based on measurement of the at least one reference signal according to the configuration message.

At block 1210, the flow chart 1200 may include additional method features, as described below.

Figure 13:
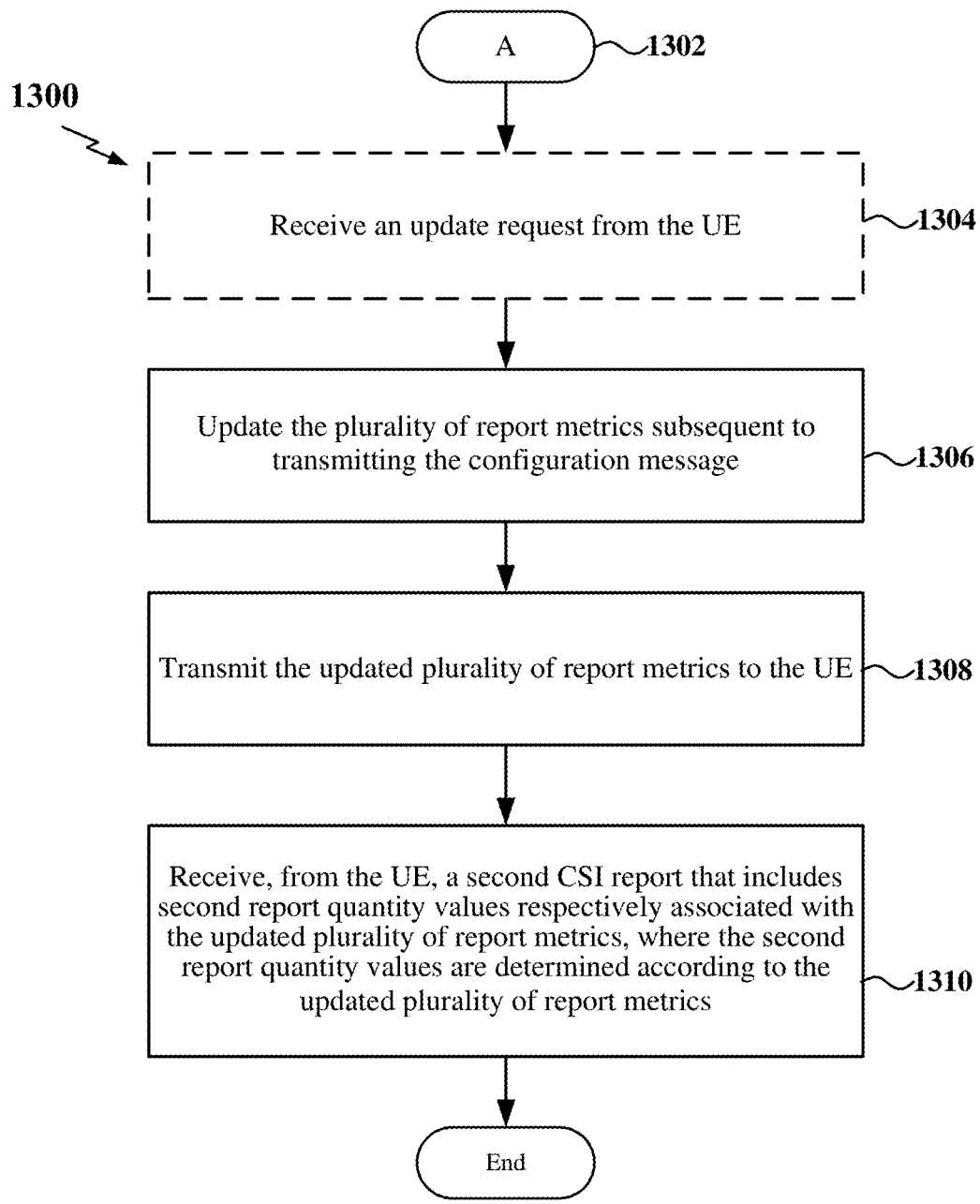
FIG. 13 is a flow chart of another exemplary method for a scheduling entity to optimize a CSI setting for a scheduled entity according to some aspects.

FIG. 13 is a flow chart 1300 of a method of wireless communication by a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1000, as described above and illustrated in FIG. 10, by a processor or processing system, or by any suitable means for carrying out the described functions.

At block 1302, the flow chart 1300 may continue from block 1210 of the flow chart 1200 of FIG. 12.

At block 1304, optionally, the scheduling entity may receive an update request from the UE.

At block 1306, the scheduling entity may update the plurality of report metrics subsequent to transmitting the configuration message. In an aspect, the scheduling entity may update the plurality of report metrics at block 1306 in response to the update request received at block 1304.

At block 1308, the scheduling entity may transmit the updated plurality of report metrics to the UE. In an aspect, the updated plurality of report metrics may be transmitted via at least one of a MAC-CE or DCI.

In an aspect, the scheduling entity at 1306 may update the plurality of report metrics by updating a plurality of mapping identifiers to generate an updated plurality of mapping identifiers that indicate mapping of the plurality of CSI resource sets with the updated plurality of report metrics. In this aspect, the scheduling entity at 1308 may transmit the updated plurality of report metrics to the UE by transmitting the updated plurality of mapping identifiers.

In an aspect, the scheduling entity at 1306 may update the plurality of report metrics by updating a report metric set identifier (ID) to determine an updated report metric set ID indicating the updated plurality of report metrics. In this aspect, the scheduling entity at 1308 may transmit the updated plurality of report metrics to the UE by transmitting the updated report metric set ID.

At block 1310, the scheduling entity may receive, from the UE, a second CSI report that includes second report quantity values respectively associated with the updated plurality of report metrics, where the second report quantity values are determined according to the updated plurality of report metrics.

In one configuration, the scheduling entity 1000 includes means for performing the various functions and processes described in relation to FIGS. 11-13. In one configuration, the scheduling entity 1000 includes means for transmitting, to a user equipment (UE), a configuration message indicating a plurality of report metrics, wherein each of the plurality of report metrics is associated with at least one corresponding channel state information (CSI) resource set of a plurality of CSI resource sets associated with a plurality of antenna panels configured for communication with the UE, means for transmitting at least one reference signal via at least one of the plurality of antenna panels to the UE in accordance with the configuration message, and means for receiving, from the UE, a CSI report that includes report quantity values respectively associated with the plurality of report metrics, wherein the report quantity values are based on measurement of the at least one reference signal according to the configuration message. In an aspect, the scheduling entity 1000 may further include means for updating the plurality of report metrics subsequent to transmitting the configuration message, means for transmitting the updated plurality of report metrics to the UE, and means for receiving, from the UE, a second CSI report that includes second report quantity values respectively associated with the updated plurality of report metrics, wherein the second report quantity values are determined according to the updated plurality of report metrics. In an aspect, the scheduling entity 1000 may further include means for receiving an update request from the UE. In an aspect, the scheduling entity 1000 may further include means for transmitting, to the UE, a message including a plurality of mapping identifiers that indicate mapping of the plurality of CSI resource sets with the plurality of report metrics, respectively.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 8 and/or 9, and utilizing, for example, the processes and/or algorithms described herein in relation to FIGS. 11-13.

Figure 14:
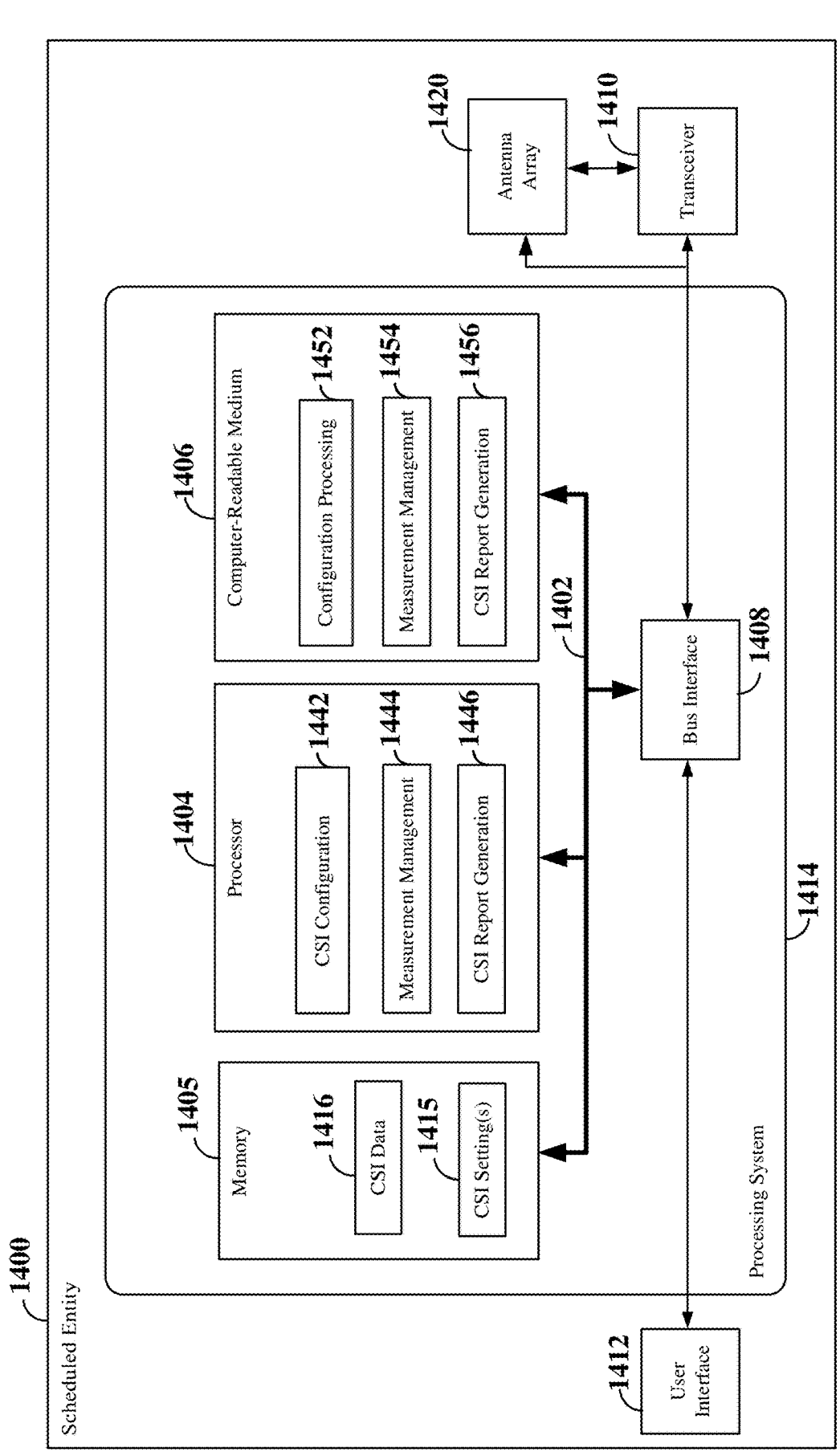
FIG. 14 is a block diagram illustrating an example of a hardware implementation of a scheduled entity employing a processing system according to some aspects.

FIG. 14 is a block diagram illustrating an example of a hardware implementation for a scheduled entity 1400 employing a processing system 1414. For example, the scheduled entity 1400 may correspond to any of the UEs or scheduled entities shown and described above in reference to FIGS. 1, 2, 8 and/or 9.

In accordance with various aspects of the disclosure, an element, or any portion of an element, or any combination of elements may be implemented with a processing system 1414 that includes one or more processors 1404. The processing system 1414 may be substantially the same as the processing system 1014 illustrated in FIG. 10, including a bus interface 1408, a bus 1402, memory 1405, a processor 1404, and a computer-readable storage medium 1406. The memory 1405 may include CSI setting(s) 1415 and CSI data 1416. Furthermore, the scheduled entity 1400 may include a user interface 1412, a transceiver 1410, and antenna array(s) 1420 substantially similar to those described above in FIG. 10. That is, the processor 1404, as utilized in a scheduled entity 1400, may be used to implement any one or more of the processes described below.

In some aspects of the disclosure, the processor 1404 may include circuitry configured for various functions. For example, the processor 1404 may include CSI configuration circuitry 1442, configured to perform functions related to receiving a configuration message and to configure the scheduled entity 1400 for CSI reporting based on the configuration message. The CSI configuration circuitry 1442 may be configured to execute CSI configuration software 1452 stored in the computer-readable storage medium 1406 to implement one or more of the functions described herein.

In various aspects of the present disclosure, the CSI configuration circuitry 1442 may be configured to receive, from a base station, a configuration message indicating a plurality of report metrics, wherein each of the plurality of report metrics is associated with at least one corresponding CSI resource set of a plurality of CSI resource sets associated with a plurality of antenna panels configured for communication with the scheduled entity. Each of the plurality of report metrics may be associated with a respective one of the plurality of antenna panels. The plurality of report metrics and/or the plurality of CSI resource sets may be stored in CSI setting(s) 1015 stored, for example, in memory 1005. For example, the CSI configuration circuitry 1442 may be configured to implement one or more of the functions described below in relation to FIGS. 15 and 16, including, e.g., block 1502 and block 1602.

In addition, the CSI configuration circuitry 1442 may further be configured to receive an updated plurality of report metrics from the base station subsequent to receiving the configuration message. For example, the CSI configuration circuitry 1442 may be configured to implement one or more of the functions described below in relation to FIG. 17, including, e.g., block 1706.

In an aspect, the CSI configuration circuitry 1442 may further be configured to transmit an update request to the base station, where the updated plurality of report metrics may be received by the CSI configuration circuitry 1442 in response to the update request. For example, the CSI configuration circuitry 1442 may be configured to implement one or more of the functions described below in relation to FIG. 17, including, e.g., block 1704.

In an aspect, the CSI configuration circuitry 1442 may further be configured to receive a message including a plurality of mapping identifiers that indicate mapping of the plurality of CSI resource sets with the plurality of report metrics, respectively. For example, the CSI configuration circuitry 1442 may be configured to implement one or more of the functions described below in relation to FIG. 16, including, e.g., block 1604.

The processor 1404 may further include measurement management circuit 1444 configured to perform functions related to making measurements for CSI reporting. The measurement management circuit 1444 may be configured to execute measurement management software 1454 stored in the computer-readable storage medium 1406 to implement one or more of the functions described herein.

In various aspects of the present disclosure, the measurement management circuit 1444 may be configured to receive a plurality of reference signals from the plurality of antenna panels. For example, the measurement management circuit 1444 may be configured to implement one or more of the functions described below in relation to FIGS. 15 and 16, including, e.g., block 1504 and block 1606.

The measurement management circuit 1444 may further be configured to perform measurements of the plurality of reference signals according to the plurality of report metrics, respectively. For example, the measurement management circuit 1444 may be configured to implement one or more of the functions described below in relation to FIGS. 15 and 16, including, e.g., block 1506 and block 1608.

The processor 1404 may further include CSI report generation circuitry 1446, configured to generate a CSI report including report quantity values based on the CSI setting(s) 1415. The CSI report generation circuitry 1446 may be configured to execute CSI report generation software 1456 stored in the computer-readable storage medium 1406 to implement one or more of the functions described herein.

In various aspects of the present disclosure, the CSI report generation circuitry 1446 may be configured to generate report quantity values respectively associated with the plurality of report metrics based on the measurements of the plurality of reference signals respectively. For example, the CSI report generation circuitry 1446 may be configured to implement one or more of the functions described below in relation to FIGS. 15 and 16, including, e.g., block 1508 and block 1610.

The CSI report generation circuitry 1446 may further be configured to transmit, to the base station, a CSI report that includes the report quantity values. For example, the CSI report generation circuitry 1446 may be configured to implement one or more of the functions described below in relation to FIGS. 15 and 16, including, e.g., block 1510 and block 1612.

The CSI report generation circuitry 1446 may further be configured to generate second report quantity values respectively associated with the updated plurality of report metrics, wherein the second report quantity values are determined according to the updated plurality of report metrics. For example, the CSI report generation circuitry 1446 may be configured to implement one or more of the functions described below in relation to FIG. 17, including, e.g., block 1708.

The CSI report generation circuitry 1446 may further be configured to transmit, to the base station, a second CSI report that includes the second report quantity values respectively associated with the updated plurality of report metrics. For example, the CSI report generation circuitry 1446 may be configured to implement one or more of the functions described below in relation to FIG. 17, including, e.g., block 1710.

Figure 15:
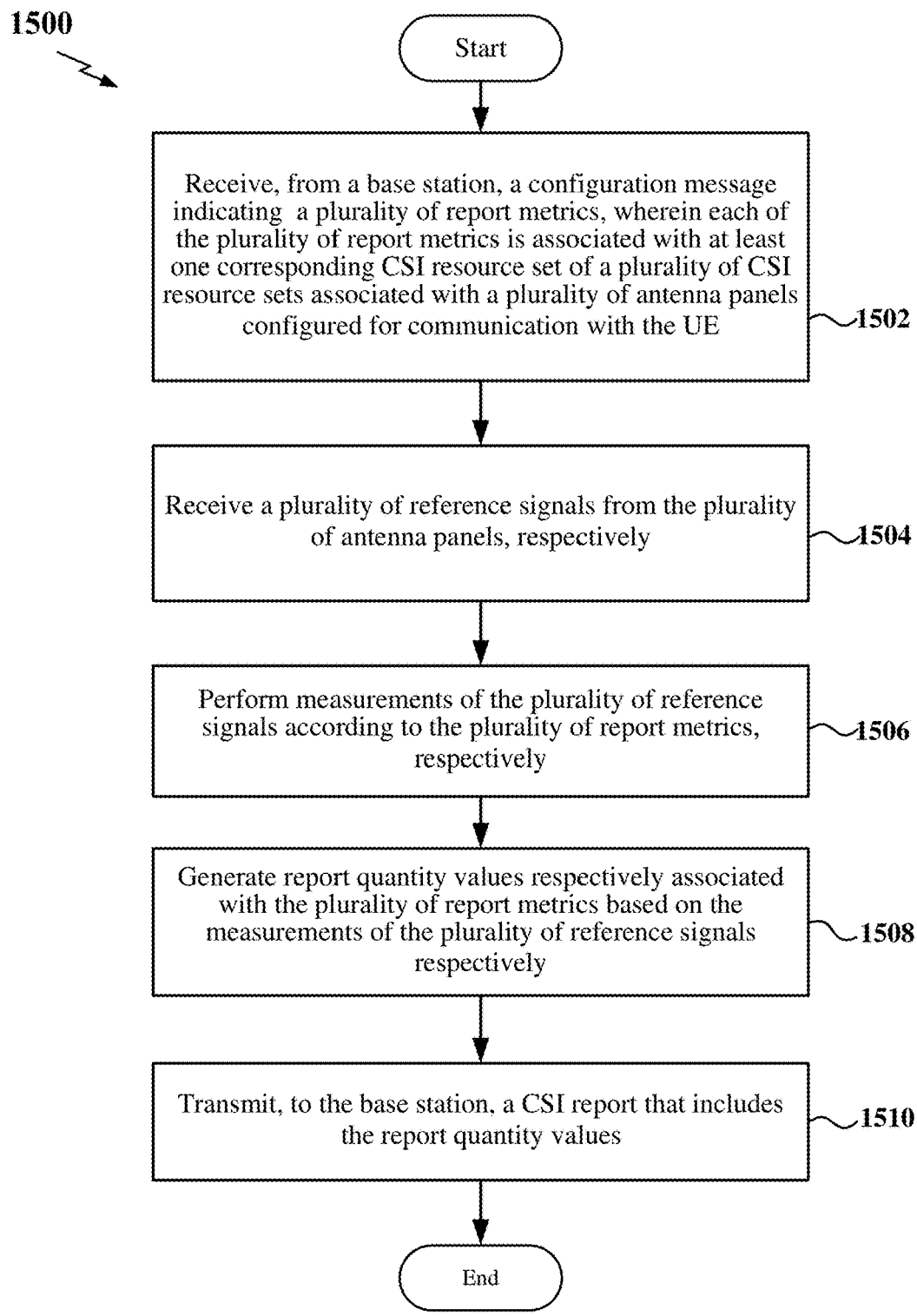
FIG. 15 is a flow chart of an exemplary method for a scheduled entity to optimize a CSI setting according to some aspects.

FIG. 15 is a flow chart 1500 of a method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1400, as described above and illustrated in FIG. 14, by a processor or processing system, or by any suitable means for carrying out the described functions.

At block 1502, the scheduled entity may receive, from a base station, a configuration message indicating a plurality of report metrics, wherein each of the plurality of report metrics is associated with at least one corresponding CSI resource set of a plurality of CSI resource sets associated with a plurality of antenna panels configured for communication with the scheduled entity. In an aspect, each of the plurality of report metrics may be associated with a respective one of the plurality of antenna panels. In an aspect, each of the plurality of report metrics may include at least one of a CQI, an RI, a PMI, a layer indicator, or a layer 1 measurement type. In an aspect, the configuration message may include at least one of an RRC configuration message, an RRC reconfiguration message, a MAC-CE, or a DCI message.

In an aspect, the at least one corresponding CSI resource set associated with each of the plurality of report metrics may include at least one of a channel measurement resource or an interference measurement resource. In an aspect, the at least one corresponding CSI resource set associated with each of the plurality of report metrics may include either the channel measurement resource or both of the channel measurement resource and the interference measurement resource based on a respective report metric of the plurality of report metrics.

In an aspect, the configuration message may further include a report metric set identifier (ID) indicating the plurality of report metrics. In an aspect, the plurality of antenna panels may be associated with a plurality of TRPs. In an aspect, each of the plurality of report metrics may further be associated with a respective one of a plurality of CSI resources within the respective one of the plurality of antenna panels.

At block 1504, the scheduled entity may receive a plurality of reference signals from the plurality of antenna panels, respectively.

At block 1506, the scheduled entity may perform measurements of the plurality of reference signals according to the plurality of report metrics, respectively.

At block 1508, the scheduled entity may generate report quantity values respectively associated with the plurality of report metrics based on the measurements of the plurality of reference signals respectively.

At block 1510, the scheduled entity may transmit, to the base station, a CSI report that includes the report quantity values.

Figure 16:
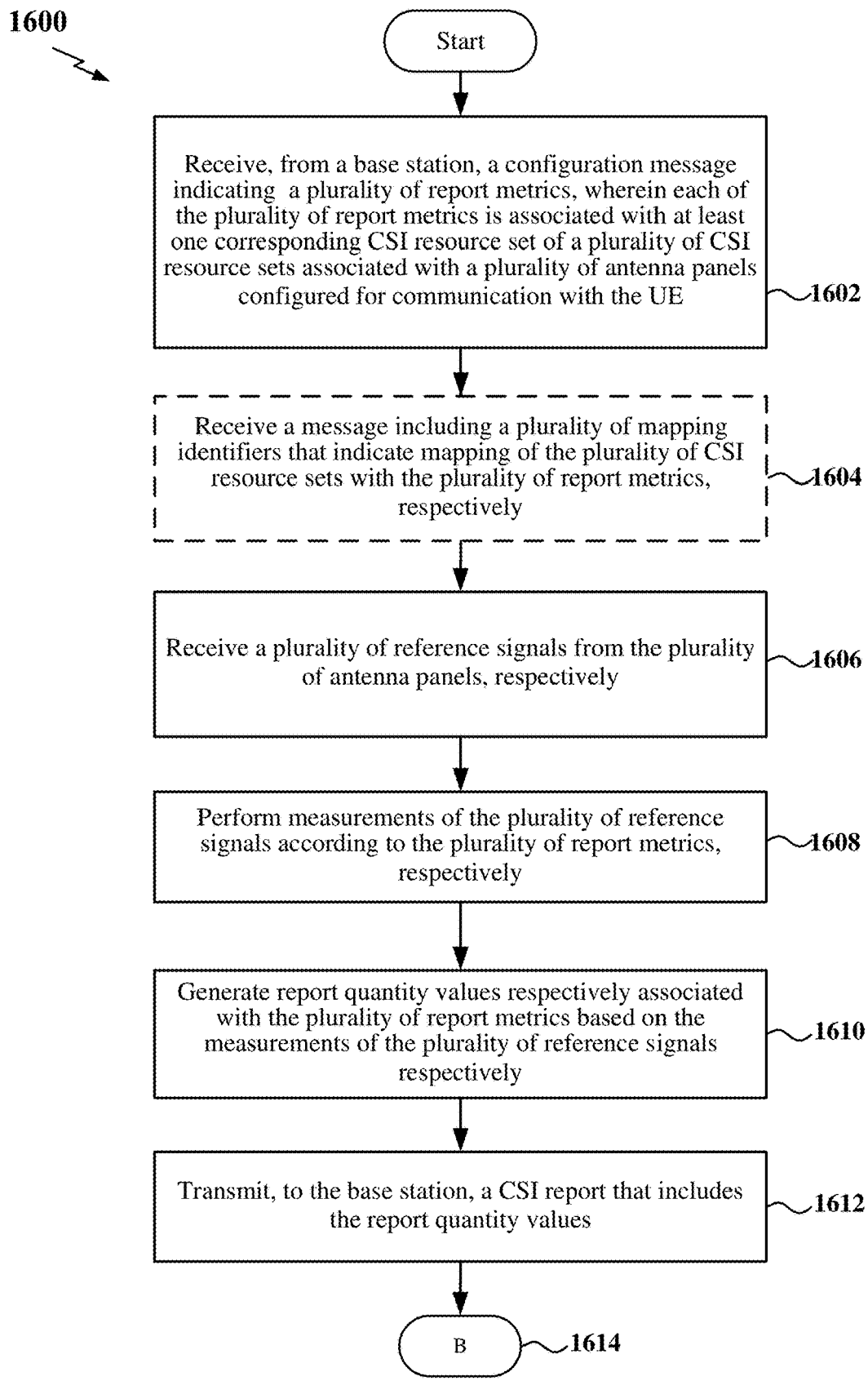
FIG. 16 is a flow chart of another exemplary method for a scheduled entity to optimize a CSI setting according to some aspects.

FIG. 16 is a flow chart 1600 of a method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1400, as described above and illustrated in FIG. 14, by a processor or processing system, or by any suitable means for carrying out the described functions.

At block 1602, the scheduled entity may receive, from a base station, a configuration message indicating a plurality of report metrics, wherein each of the plurality of report metrics is associated with at least one corresponding CSI resource set of a plurality of CSI resource sets associated with a plurality of antenna panels configured for communication with the scheduled entity. In an aspect, each of the plurality of report metrics may be associated with a respective one of the plurality of antenna panels. In an aspect, each of the plurality of report metrics may include at least one of a CQI, an RI, a PMI, a layer indicator, or a layer 1 measurement type. In an aspect, the configuration message may include at least one of an RRC configuration message, an RRC reconfiguration message, a MAC-CE, or a DCI message.

In an aspect, the at least one corresponding CSI resource set associated with each of the plurality of report metrics may include at least one of a channel measurement resource or an interference measurement resource. In an aspect, the at least one corresponding CSI resource set associated with each of the plurality of report metrics may include either the channel measurement resource or both of the channel measurement resource and the interference measurement resource based on a respective report metric of the plurality of report metrics.

In an aspect, the configuration message may further include a report metric set identifier (ID) indicating the plurality of report metrics. In an aspect, the plurality of antenna panels may be associated with a plurality of TRPs. In an aspect, each of the plurality of report metrics may further be associated with a respective one of a plurality of CSI resources within the respective one of the plurality of antenna panels.

In an aspect, the configuration message may further include a plurality of mapping identifiers that indicate mapping of the plurality of CSI resource sets with the plurality of report metrics, respectively.

In an aspect, at block 1604, optionally, the scheduled entity may receive a message including a plurality of mapping identifiers that indicate mapping of the plurality of CSI resource sets with the plurality of report metrics, respectively.

In an aspect, the plurality of report metrics may be indicated in the configuration message according to a first order that corresponds to a second order of the plurality of CSI resource sets to map each of the plurality of report metrics to the at least one corresponding CSI resource set.

At block 1606, the scheduled entity may receive a plurality of reference signals from the plurality of antenna panels, respectively.

At block 1608, the scheduled entity may perform measurements of the plurality of reference signals according to the plurality of report metrics, respectively.

At block 1610, the scheduled entity may generate report quantity values respectively associated with the plurality of report metrics based on the measurements of the plurality of reference signals respectively.

At block 1612, the scheduled entity may transmit, to the base station, a CSI report that includes the report quantity values.

At block 1614, the flow chart 1600 may include additional method features, as described below.

Figure 17:
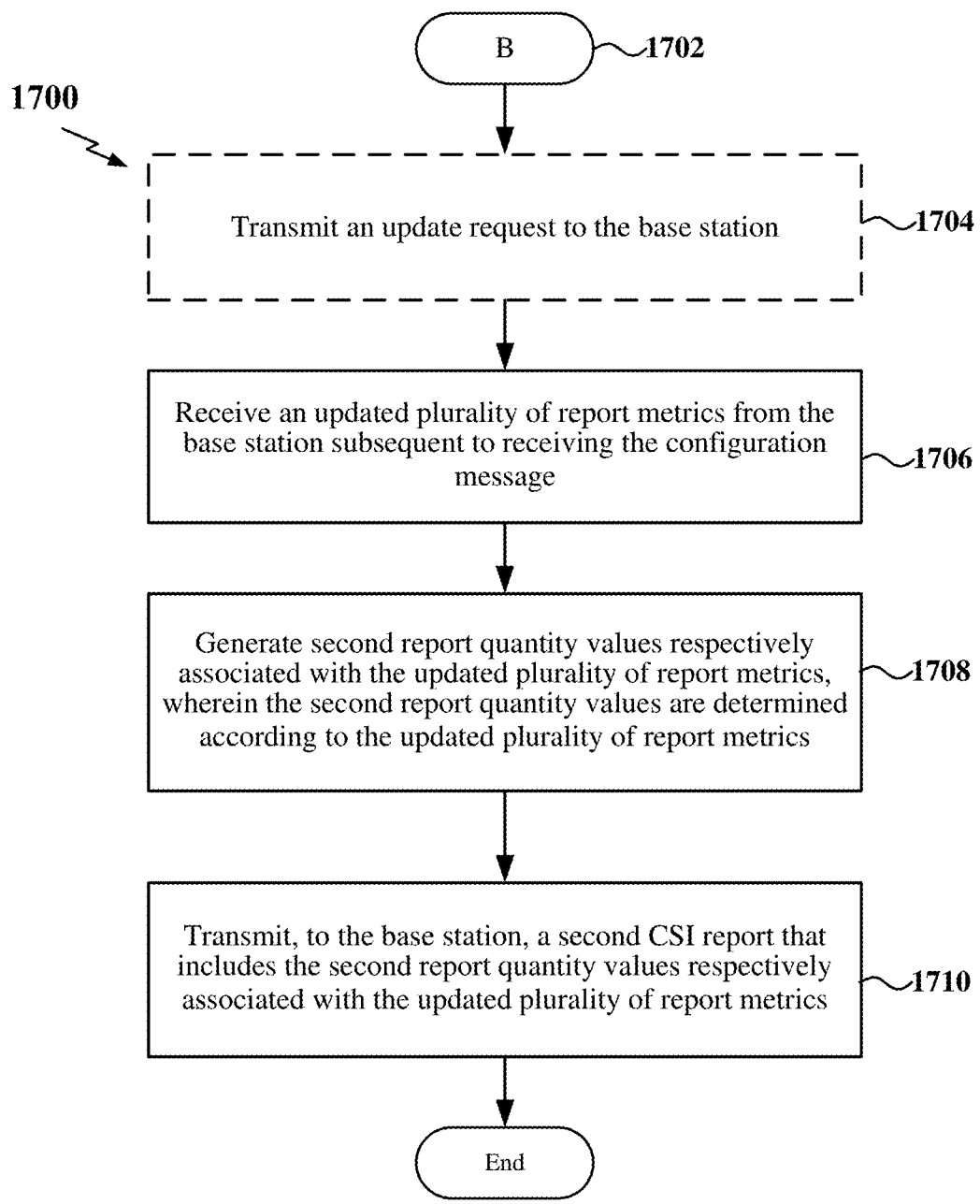
FIG. 17 is a flow chart of another exemplary method for a scheduled entity to optimize a CSI setting according to some aspects.

FIG. 17 is a flow chart 1700 of a method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1400, as described above and illustrated in FIG. 14, by a processor or processing system, or by any suitable means for carrying out the described functions.

At block 1702, the flow chart 1700 may continue from block 1614 of the flow chart 1600 of FIG. 16.

At block 1704, optionally, the scheduled entity may transmit an update request to the base station.

At block 1706, the scheduled entity may receive an updated plurality of report metrics from the base station subsequent to receiving the configuration message. In an aspect, the updated plurality of report metrics may be received in response to the update request transmitted at block 1704. In an aspect, the updated plurality of report metrics may be received via at least one of a MAC-CE or DCI.

In an aspect, the scheduled entity at 1706 may receive the updated plurality of report metrics by receiving an updated plurality of mapping identifiers that indicate mapping of the plurality of CSI resource sets with the updated plurality of report metrics. In an aspect, the updated plurality of report metrics may be received by receiving an updated report metric set identifier (ID) indicating the updated plurality of report metrics.

At block 1708, the scheduled entity may generate second report quantity values respectively associated with the updated plurality of report metrics, wherein the second report quantity values are determined according to the updated plurality of report metrics.

At block 1710, the scheduled entity may transmit, to the base station, a second CSI report that includes the second report quantity values respectively associated with the updated plurality of report metrics.

In one configuration, the scheduled entity 1400 includes means for performing the various functions and processes described in relation to FIGS. 15-17. In one configuration, the scheduled entity 1400 includes means for receiving, from a base station, a configuration message indicating a plurality of report metrics, wherein each of the plurality of report metrics is associated with at least one corresponding channel state information (CSI) resource set of a plurality of CSI resource sets associated with a plurality of antenna panels configured for communication with the UE, means for receiving a plurality of reference signals from the plurality of antenna panels, respectively, means for performing measurements of the plurality of reference signals according to the plurality of report metrics, respectively, means for generating report quantity values respectively associated with the plurality of report metrics based on the measurements of the plurality of reference signals respectively, and means for transmitting, to the base station, a CSI report that includes the report quantity values. In an aspect, the scheduled entity 1400 may further include means for receiving an updated plurality of report metrics from the base station subsequent to receiving the configuration message, means for generating second report quantity values respectively associated with the updated plurality of report metrics, wherein the second report quantity values are determined according to the updated plurality of report metrics, and means for transmitting, to the base station, a second CSI report that includes the second report quantity values respectively associated with the updated plurality of report metrics. In an aspect, the scheduled entity 1400 may further include means for transmitting an update request to the base station. In an aspect, the scheduled entity 1400 may further include means for receiving a message including a plurality of mapping identifiers that indicate mapping of the plurality of CSI resource sets with the plurality of report metrics, respectively.

In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 8 and/or 9, and utilizing, for example, the processes and/or algorithms described herein in relation to FIGS. 15-17.

The following provides an overview of several aspects of the present disclosure.

Aspect 1: A method of wireless communication at a base station, comprising: transmitting, to a user equipment (UE), a configuration message indicating a plurality of report metrics, wherein each of the plurality of report metrics is associated with at least one corresponding channel state information (CSI) resource set of a plurality of CSI resource sets associated with a plurality of antenna panels configured for communication with the UE; transmitting at least one reference signal via at least one of the plurality of antenna panels to the UE in accordance with the configuration message; and receiving, from the UE, a CSI report that includes report quantity values respectively associated with the plurality of report metrics, wherein the report quantity values are based on measurement of the at least one reference signal according to the configuration message.

Aspect 2: The method of aspect 1, wherein each of the plurality of report metrics is associated with a respective one of the plurality of antenna panels.

Aspect 3: The method of aspect 1 or 2, further comprising: updating the plurality of report metrics subsequent to transmitting the configuration message; transmitting the updated plurality of report metrics to the UE; and receiving, from the UE, a second CSI report that includes second report quantity values respectively associated with the updated plurality of report metrics, wherein the second report quantity values are determined according to the updated plurality of report metrics.

Aspect 4: The method of aspect 3, further comprising: receiving an update request from the UE, wherein the updating the plurality of report metrics is performed in response to the update request.

Aspect 5: The method of aspect 3 or 4, wherein the updated plurality of report metrics are transmitted via at least one of a medium access control (MAC) control element (MAC-CE) or downlink control information (DCI).

Aspect 6: The method of any of aspects 3 through 5, wherein the updating the plurality of report metrics is performed by updating a plurality of mapping identifiers to generate an updated plurality of mapping identifiers that indicate mapping of the plurality of CSI resource sets with the updated plurality of report metrics, and wherein the transmitting the updated plurality of report metrics to the UE comprises transmitting the updated plurality of mapping identifiers.

Aspect 7: The method of any of aspects 3 through 5, wherein the updating the plurality of report metrics is performed by updating a report metric set identifier (ID) to determine an updated report metric set ID indicating the updated plurality of report metrics, and wherein the transmitting the updated plurality of report metrics to the UE comprises transmitting the updated report metric set ID.

Aspect 8: The method of any of aspects 1 through 7, wherein the configuration message further comprises a report metric set identifier (ID) indicating the plurality of report metrics.

Aspect 9: The method of any of aspects 1 through 8, wherein the configuration message further includes a plurality of mapping identifiers that indicate mapping of the plurality of CSI resource sets with the plurality of report metrics, respectively.

Aspect 10: The method of any of aspects 1 through 9, further comprising: transmitting, to the UE, a message including a plurality of mapping identifiers that indicate mapping of the plurality of CSI resource sets with the plurality of report metrics, respectively.

Aspect 11: The method of any of aspects 1 through 10, wherein the plurality of report metrics are indicated in the configuration message according to a first order that corresponds to a second order of the plurality of CSI resource sets to map each of the plurality of report metrics to the at least one corresponding CSI resource set.

Aspect 12: The method of any of aspects 1 through 11, wherein each of the plurality of report metrics includes at least one of a channel quality indicator (CQI), a rank indicator (RI), a precoding matrix indicator (PMI), a layer indicator, or a layer 1 measurement type.

Aspect 13: The method of any of aspects 1 through 12, wherein the configuration message includes at least one of a radio resource control (RRC) configuration message, an RRC reconfiguration message, a medium access control (MAC) control element (MAC-CE), or a downlink control information (DCI) message.

Aspect 14: The method of any of aspects 1 through 13, wherein the configuration message includes a CSI report configuration information element for configuring a CSI report setting, the CSI report configuration information element indicating the plurality of report metrics.

Aspect 15: The method of any of aspects 1 through 14, wherein the at least one corresponding CSI resource set associated with each of the plurality of report metrics includes at least one of a channel measurement resource or an interference measurement resource.

Aspect 16: The method of aspect 15, wherein the at least one corresponding CSI resource set associated with each of the plurality of report metrics includes either the channel measurement resource or both of the channel measurement resource and the interference measurement resource based on a respective report metric of the plurality of report metrics.

Aspect 17: The method of any of aspects 1 through 16, wherein the plurality of antenna panels are associated with a plurality of transmission and reception points (TRPs).

Aspect 18: The method of any of aspects 1 through 17, wherein each of the plurality of report metrics is further associated with a respective one of a plurality of CSI resources within the respective one of the plurality of antenna panels.

Aspect 19: A base station comprising: a transceiver configured to communicate with a radio access network, a memory, and a processor communicatively coupled to the transceiver and the memory, wherein the processor and the memory are configured to perform any one of aspects 1 through 18.

Aspect 20: A base station configured for wireless communication comprising at least one means for performing any one of aspects 1 through 18.

Aspect 21: A non-transitory computer-readable storage medium having instructions for a base station thereon, wherein the instructions, when executed by a processing circuit, cause the processing circuit to perform any one of aspects 1 through 18.

Aspect 22: A method of wireless communication by a user equipment (UE), comprising: receiving, from a base station, a configuration message indicating a plurality of report metrics, wherein each of the plurality of report metrics is associated with at least one corresponding channel state information (CSI) resource set of a plurality of CSI resource sets associated with a plurality of antenna panels configured for communication with the UE; receiving a plurality of reference signals from the plurality of antenna panels, respectively; performing measurements of the plurality of reference signals according to the plurality of report metrics, respectively; generating report quantity values respectively associated with the plurality of report metrics based on the measurements of the plurality of reference signals respectively; and transmitting, to the base station, a CSI report that includes the report quantity values.

Aspect 23: The method of aspect 22, wherein each of the plurality of report metrics is associated with a respective one of the plurality of antenna panels.

Aspect 24: The method of aspect 22 or 23, further comprising: receiving an updated plurality of report metrics from the base station subsequent to receiving the configuration message; generating second report quantity values respectively associated with the updated plurality of report metrics, wherein the second report quantity values are determined according to the updated plurality of report metrics; and transmitting, to the base station, a second CSI report that includes the second report quantity values respectively associated with the updated plurality of report metrics.

Aspect 25: The method of aspect 24, further comprising: transmitting an update request to the base station, wherein the updated plurality of report metrics are received in response to the update request.

Aspect 26: The method of aspect 24 or 25, wherein the updated plurality of report metrics are received via at least one of a medium access control (MAC) control element (MAC-CE) or downlink control information (DCI).

Aspect 27: The method of any of aspects 24 through 26, wherein the updated plurality of report metrics are received by receiving an updated plurality of mapping identifiers that indicate mapping of the plurality of CSI resource sets with the updated plurality of report metrics.

Aspect 28: The method of any of aspects 24 through 26, wherein the updated plurality of report metrics are received by receiving an updated report metric set identifier (ID) indicating the updated plurality of report metrics.

Aspect 29: The method of any of aspects 22 through 28, wherein the configuration message further comprises a report metric set identifier (ID) indicating the plurality of report metrics.

Aspect 30: The method of any of aspects 22 through 29, wherein the configuration message further includes a plurality of mapping identifiers that indicate mapping of the plurality of resource sets with the plurality of report metrics, respectively.

Aspect 31: The method of any of aspects 22 through 30, further comprising: receiving a message including a plurality of mapping identifiers that indicate mapping of the plurality of CSI resource sets with the plurality of report metrics, respectively.

Aspect 32: The method of any of aspects 22 through 31, wherein the plurality of report metrics are indicated in the configuration message according to a first order that corresponds to a second order of the plurality of CSI resource sets to map each of the plurality of report metrics to the at least one corresponding CSI resource set.

Aspect 33: The method of any of aspects 22 through 32, each of the plurality of report metrics includes at least one of a channel quality indicator (CQI), a rank indicator (RI), a precoding matrix indicator (PMI), a layer indicator, or a layer 1 measurement type.

Aspect 34: The method of any of aspects 22 through 33, wherein the configuration message includes at least one of a radio resource control (RRC) configuration message, an RRC reconfiguration message, a medium access control (MAC) control element, or a downlink control information (DCI) message.

Aspect 35: The method of any of aspects 22 through 34, wherein the configuration message includes a CSI report configuration information element for configuring a CSI report setting, the CSI report configuration information element indicating the plurality of report metrics.

Aspect 36: The method of any of aspects 22 through 35, wherein the at least one corresponding CSI resource set associated with each of the plurality of report metrics includes at least one of a channel measurement resource or an interference measurement resource.

Aspect 37: The method of aspect 36, wherein the at least one corresponding CSI resource set associated with each of the plurality of report metrics includes either the channel measurement resource or both of the channel measurement resource and the interference measurement resource based on a respective report metric of the plurality of report metrics.

Aspect 38: The method of any of aspects 22 through 37, wherein the plurality of antenna panels are associated with a plurality of transmission and reception points (TRPs).

Aspect 39: The method of any of aspects 22 through 38, wherein each of the plurality of report metrics is further associated with a respective one of a plurality of CSI resources within the respective one of the plurality of antenna panels.

Aspect 40: A UE comprising: a transceiver configured to communicate with a radio access network, a memory, and a processor communicatively coupled to the transceiver and the memory, wherein the processor and the memory are configured to perform any one of aspects 22 through 39.

Aspect 41: A UE configured for wireless communication comprising at least one means for performing any one of aspects 22 through 39.

Aspect 42: A non-transitory computer-readable storage medium having instructions for a UE thereon, wherein the instructions, when executed by a processing circuit, cause the processing circuit to perform any one of aspects 22 through 39.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 8-10 and/or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a network entity, comprising:
    transmitting a configuration message indicating a plurality of report metrics respectively associated with a plurality of antenna panels of the network entity, wherein each of the plurality of report metrics is associated with at least one corresponding CSI resource set of a plurality of CSI resource sets that are respectively associated with the plurality of antenna panels of the network entity, wherein each of the plurality of report metrics includes at least one of a channel quality indicator (CQI), a precoding matrix indicator (PMI), a layer indicator, or a layer 1 measurement type, wherein the configuration message includes a CSI report configuration information element for configuring a CSI report setting, the CSI report configuration information element indicating the plurality of report metrics respectively associated with the plurality of antenna panels of the network entity, wherein the CSI report configuration information element lists the plurality of report metrics in a first order and lists the plurality of CSI resource sets in a second order that corresponds to the first order to match a position of each report metric of the plurality of report metrics listed in the first order with a position of a corresponding CSI resource set of the plurality of CSI resource sets listed in the second order;
    transmitting at least one reference signal via at least one of the plurality of antenna panels associated with the network entity in accordance with the configuration message; and
    receiving a channel state information (CSI) report that includes report quantity values respectively associated with the plurality of report metrics, the plurality of report metrics specifying the report quantity values for each of the plurality of antenna panels to be reported to the network entity, wherein the report quantity values are based on measurement of the at least one reference signal.

2. The method of claim 1, wherein each of the plurality of report metrics is associated with a respective one of the plurality of antenna panels.

3. The method of claim 1, further comprising:
    updating the plurality of report metrics subsequent to transmitting the configuration message;
    transmitting the updated plurality of report metrics; and
    receiving a second CSI report that includes second report quantity values respectively associated with the updated plurality of report metrics, wherein the second report quantity values are determined according to the updated plurality of report metrics.

4. The method of claim 3, further comprising:
    receiving an update request,
    wherein the updating the plurality of report metrics is performed in response to the update request.

5. The method of claim 3, wherein the updating the plurality of report metrics is performed by updating a plurality of mapping identifiers to generate an updated plurality of mapping identifiers that indicate mapping of the plurality of CSI resource sets with the updated plurality of report metrics, and wherein the transmitting the updated plurality of report metrics comprises transmitting the updated plurality of mapping identifiers.

6. The method of claim 3, wherein the updating the plurality of report metrics is performed by updating a report metric set identifier (ID) to determine an updated report metric set ID indicating the updated plurality of report metrics, and wherein the transmitting the updated plurality of report metrics comprises transmitting the updated report metric set ID.

7. The method of claim 1, wherein the configuration message includes a plurality of mapping identifiers that indicate mapping of the plurality of CSI resource sets with the plurality of report metrics, respectively.

8. The method of claim 1, further comprising:
    transmitting a message including a plurality of mapping identifiers that indicate mapping of the plurality of CSI resource sets with the plurality of report metrics, respectively.

9. The method of claim 1, wherein the at least one corresponding CSI resource set associated with each of the plurality of report metrics includes a channel measurement resource without an interference measurement resource when a respective report metric of the plurality of report metric is based on a channel measurement without an interference measurement, and
    wherein the at least one corresponding CSI resource set associated with each of the plurality of report metrics includes both of the channel measurement resource and the interference measurement resource when the respective report metric of the plurality of report metric is based on the channel measurement and the interference measurement.

10. A network entity for wireless communication, comprising:
    one or more processors; and
    a memory communicatively coupled to the one or more processors, wherein the one or more processors are configured to:
transmit a configuration message indicating a plurality of report metrics respectively associated with a plurality of antenna panels of the network entity, wherein each of the plurality of report metrics is associated with at least one corresponding CSI resource set of a plurality of CSI resource sets that are respectively associated with the plurality of antenna panels of the network entity, wherein each of the plurality of report metrics includes at least one of a channel quality indicator (CQI), a precoding matrix indicator (PMI), a layer indicator, or a layer 1 measurement type, wherein the configuration message includes a CSI report configuration information element for configuring a CSI report setting, the CSI report configuration information element indicating the plurality of report metrics respectively associated with the plurality of antenna panels of the network entity, wherein the CSI report configuration information element lists the plurality of report metrics in a first order and lists the plurality of CSI resource sets in a second order that corresponds to the first order to match a position of each report metric of the plurality of report metrics listed in the first order with a position of a corresponding CSI resource set of the plurality of CSI resource sets listed in the second order;
transmit at least one reference signal via at least one of the plurality of antenna panels associated with the network entity; and
receive a channel state information (CSI) report that includes report quantity values respectively associated with the plurality of report, the plurality of report metrics specifying the report quantity values for each of the plurality of antenna panels to be reported to the network entity, wherein the report quantity values are based on measurement of the at least one reference signal.

11. The network entity of claim 10, wherein each of the plurality of report metrics is associated with a respective one of the plurality of antenna panels.

12. The network entity of claim 10, wherein the one or more processors are further configured to:
update the plurality of report metrics subsequent to transmitting the configuration message;
transmit the updated plurality of report metrics; and
receive a second CSI report that includes second report quantity values respectively associated with the updated plurality of report metrics, wherein the second report quantity values are determined according to the updated plurality of report metrics.

13. The network entity of claim 12, wherein the one or more processors are further configured to:
receive an update request,
wherein the updating the plurality of report metrics is performed in response to the update request.

14. A method of wireless communication by a user equipment (UE), comprising:
receiving, from a network entity, a configuration message indicating a plurality of report metrics respectively associated with a plurality of antenna panels of the network entity, wherein each of the plurality of report metrics is associated with at least one corresponding CSI resource set of a plurality of CSI resource sets respectively associated with the plurality of antenna panels, wherein each of the plurality of report metrics includes at least one of a channel quality indicator (CQI), a precoding matrix indicator (PMI), a layer indicator, or a layer 1 measurement type, wherein the configuration message includes a CSI report configuration information element for configuring a CSI report setting, the CSI report configuration information element indicating the plurality of report metrics respectively associated with the plurality of antenna panels of the network entity, wherein the CSI report configuration information element lists the plurality of report metrics in a first order and lists the plurality of CSI resource sets in a second order that corresponds to the first order to match a position of each report metric of the plurality of report metrics listed in the first order with a position of a corresponding CSI resource set of the plurality of CSI resource sets listed in the second order;
receiving, from the network entity, a plurality of reference signals from the plurality of antenna panels associated with the network entity, respectively;
performing measurements of the plurality of reference signals according to the plurality of report metrics, respectively, the plurality of report metrics specifying report quantity values for each of the plurality of antenna panels to be reported to the network entity;
generating the report quantity values respectively associated with the plurality of report metrics based on the measurements of the plurality of reference signals respectively; and
transmitting, to the network entity, a CSI report that includes the report quantity values.

15. The method of claim 14, wherein each of the plurality of report metrics is associated with a respective one of the plurality of antenna panels.

16. The method of claim 14, further comprising:
receiving an updated plurality of report metrics from the network entity subsequent to receiving the configuration message;
generating second report quantity values respectively associated with the updated plurality of report metrics, wherein the second report quantity values are determined according to the updated plurality of report metrics; and
transmitting, to the network entity, a second CSI report that includes the second report quantity values respectively associated with the updated plurality of report metrics.

17. The method of claim 16, further comprising:
transmitting an update request to the network entity,
wherein the updated plurality of report metrics are received in response to the update request.

18. The method of claim 16, wherein the updated plurality of report metrics are received by receiving an updated plurality of mapping identifiers that indicate mapping of the plurality of CSI resource sets with the updated plurality of report metrics.

19. The method of claim 16, wherein the updated plurality of report metrics are received by receiving an updated report metric set identifier (ID) indicating the updated plurality of report metrics.

20. The method of claim 14, wherein the configuration message further includes a plurality of mapping identifiers that indicate mapping of the plurality of CSI resource sets with the plurality of report metrics, respectively.

21. The method of claim 14, further comprising:
receiving a message including a plurality of mapping identifiers that indicate mapping of the plurality of CSI resource sets with the plurality of report metrics, respectively.

22. The method of claim 14, wherein the at least one corresponding CSI resource set associated with each of the plurality of report metrics includes a channel measurement resource without an interference measurement resource when a respective report metric of the plurality of report metric is based on a channel measurement without an interference measurement, and
wherein the at least one corresponding CSI resource set associated with each of the plurality of report metrics includes both of the channel measurement resource and the interference measurement resource when the respective report metric of the plurality of report metric is based on the channel measurement and the interference measurement.

23. A user equipment (UE) for wireless communication by a user equipment (UE), comprising:
one or more processors; and
a memory communicatively coupled to the one or more processors,
wherein the one or more processors are configured to:
receive, from a network entity, a configuration message indicating a plurality of report metrics respectively associated with a plurality of antenna panels of the network entity, wherein each of the plurality of report metrics is associated with at least one corresponding CSI resource set of a plurality of CSI resource sets respectively associated with the plurality of antenna panels, each of the plurality of report metrics includes at least one of a channel quality indicator (CQI), a precoding matrix indicator (PMI), a layer indicator, or a layer 1 measurement type, wherein the configuration message includes a CSI report configuration information element for configuring a CSI report setting, the CSI report configuration information element indicating the plurality of report metrics respectively associated with the plurality of antenna panels of the network entity, wherein the CSI report configuration information element lists the plurality of report metrics in a first order and lists the plurality of CSI resource sets in a second order that corresponds to the first order to match a position of each report metric of the plurality of report metrics listed in the first order with a position of a corresponding CSI resource set of the plurality of CSI resource sets listed in the second order;
receive, from the network entity, a plurality of reference signals from the plurality of antenna panels associated with the network entity, respectively;
perform measurements of the plurality of reference signals according to the plurality of report metrics, respectively, the plurality of report metrics specifying report quantity values for each of the plurality of antenna panels to be reported to the network entity;
generate the report quantity values respectively associated with the plurality of report metrics based on the measurements of the plurality of reference signals respectively; and
transmit, to the network entity, a CSI report that includes the report quantity values.

24. The UE of claim 23, wherein each of the plurality of report metrics is associated with a respective one of the plurality of antenna panels.

25. The UE of claim 23, wherein the one or more processors are further configured to:
receive an updated plurality of report metrics from the network entity subsequent to receiving the configuration message;
generate second report quantity values respectively associated with the updated plurality of report metrics, wherein the second report quantity values are determined according to the updated plurality of report metrics; and
transmit, to the network entity, a second CSI report that includes the second report quantity values respectively associated with the updated plurality of report metrics.

26. The UE of claim 25, wherein the one or more processors are further configured to:
transmit an update request to the network entity,
wherein the updated plurality of report metrics are received in response to the update request.

27. The method of claim 1, wherein each of the plurality of report metrics includes one of: 'none', 'cri-RI-PMI-CQI' 'cri-RI-i1', 'cri-RI-i1-CQI', 'cri-RI-CQI', 'cri-RSRP', 'cri-SINR', 'ssb-Index-RSRP,' and 'ssb-Index-SINR'.

* * * * *